US012782633B2

(12) United States Patent
Bar-On et al.

(10) Patent No.: US 12,782,633 B2
(45) Date of Patent: Nov. 3, 2026

(54) METHOD FOR GENERATING AND INTERACTING WITH POLYMERIC PHOTONIC INTEGRATED CIRCUITS

(71) Applicant: LUMA BIOPHOTONICS LTD, Tel Aviv (IL)

(72) Inventors: Ofer Bar-On, Tel Aviv (IL); Omer Kotlicki, Tel Aviv (IL)

(73) Assignee: LUMA BIOPHOTONICS LTD, Tel Aviv (IL)

( * ) Notice: Subject to any disclaimer, the term of this patent is extended or adjusted under 35 U.S.C. 154(b) by 449 days.

(21) Appl. No.: 18/258,771

(22) PCT Filed: Dec. 16, 2021

(86) PCT No.: PCT/GB2021/053342

§ 371 (c)(1),
(2) Date: Jun. 21, 2023

(87) PCT Pub. No.: WO2022/136842

PCT Pub. Date: Jun. 30, 2022

(65) Prior Publication Data

US 2024/0061174 A1 Feb. 22, 2024

Related U.S. Application Data

(60) Provisional application No. 63/128,871, filed on Dec. 22, 2020.

(51) Int. Cl.
*G02B 6/122* (2006.01)
*G02B 6/12* (2006.01)
*G02B 6/44* (2006.01)

(52) U.S. Cl.
CPC ....... *G02B 6/1221* (2013.01); *G02B 6/12004* (2013.01); *G02B 6/4455* (2013.01);
(Continued)

(58) Field of Classification Search
CPC .................................................... G02B 6/1221
See application file for complete search history.

(56) References Cited

U.S. PATENT DOCUMENTS

2001/0028769 A1* 10/2001 Deacon ................ G02F 1/3132 385/37
2003/0174955 A1 9/2003 Chen et al.
(Continued)

FOREIGN PATENT DOCUMENTS

CN 102721431 A * 10/2012
EP 0420173 A2 4/1991

OTHER PUBLICATIONS

CN-102721431-A English translation (Year: 2012).*
International Search Report and Written Opinion in PCT/GB2021/053342, mailed May 11, 2022, 24 pages.

*Primary Examiner* — Charlie Y Peng
(74) *Attorney, Agent, or Firm* — McKee, Voorhees & Sease, PLC

(57) ABSTRACT

There is provided a polymer based photonic integrated circuit (PIC) comprising: a first polymeric layer, the first polymeric layer having a refractive index of from 1.3 to 1.8 at a wavelength of 1300 nm; and a second polymeric layer on the first polymeric layer, the second polymeric layer having a refractive index of from 1.4 to 1.9 at a wavelength of 1300 nm and an optical loss of at most 10 dB/cm at a wavelength of 1300 mm. The difference between the refractive index of the first polymeric layer and the refractive index of the second polymeric layer is at least 0.1 at a wavelength of 1300 nm. An interface between the first polymeric layer and the second polymeric layer is patterned with a relief pattern to form a plurality of optical elements. The plurality of optical elements comprises an I/O grating, a 2D waveguide, and a spectral shaping element.

19 Claims, 17 Drawing Sheets

(52) U.S. Cl.
CPC .............. *G02B 2006/12107* (2013.01); *G02B 2006/12119* (2013.01); *G02B 2006/12138* (2013.01); *G02B 2006/12159* (2013.01)

(56) References Cited

U.S. PATENT DOCUMENTS

| | | | | |
|---|---|---|---|---|
| 2003/0176002 | A1* | 9/2003 | Zhang | G02B 6/132 438/22 |
| 2014/0176957 | A1* | 6/2014 | Bienstman | G01N 21/45 356/450 |
| 2019/0067830 | A1* | 2/2019 | Xu | G02F 1/065 |
| 2019/0196098 | A1 | 6/2019 | Yang et al. | |
| 2022/0342219 | A1* | 10/2022 | Sung | G02B 6/1221 |

* cited by examiner

METHOD FOR GENERATING AND INTERACTING WITH POLYMERIC PHOTONIC INTEGRATED CIRCUITS

FIELD

The present invention is in the field of Photonic integrated circuits (PICs) and more specifically low-cost polymer-based PICs and PIC readers.

BACKGROUND

Photonic integrated circuits (PICs) are the optical equivalent of electrical, semiconductor based, integrated circuits. PICs bind together various optical elements (e.g., couplers, splitters, resonators, attenuators, etc.) of nanometric to millimetric scale, to achieve passive and active manipulation of light. PIC technology has demonstrated great promise in the fields of sensing, communications, energy harvesting, and more. Such versatility is based on the inherent advantages of light-based technologies like speed, accuracy, and sensitivity.

In order to produce PICs, advanced nanotechnology and semiconductor processing techniques are usually required, which include Silicon on Insulator (SOI), SiN, InP, etc. Another method for realizing PICs involves thin polymer films, which can be produced using simple, fast and cost-effective fabrication techniques (e.g., casting, moulding, spin coating). Polymer based PICs are a promising platform; however, the design and fabrication of different optical elements such as grating couplers, waveguides, and spectral shaping elements, using polymers on a single chip, remains a challenge.

Another major challenge with the use of PICs is the need to couple light into their inputs and out of their outputs. This is a major challenge as there are no straightforward alternatives to the simplicity of electrical wires in the optical domain and in applications where PICs require repeated replacement, such coupling of light can necessitate precise alignment of both input and output waves by either manipulating beams in free space or an alignment of optical waveguides (e.g., optical fibers).

On the PIC side, external light can either be fed directly to the waveguides (butt coupling) or using grating couplers. Butt coupling requires highly precise control of the beams, within the perimeter of a single wavelength (scale of ~1 um). Grating couplers ease that restriction by an order of magnitude or two, at the expense of design and fabrication complexities which can manifest as significant coupling losses.

Biosensing Using PICs:

The detection of residual amounts of different molecules is of major importance in various fields such as medical diagnostics, food quality, environmental/water monitoring, explosives detection, and more. For example, in the medical field, the ability to detect important biomarkers in the human body can provide an important diagnostic tool and help with treatment. To date, a large range of diagnostic methods exist in the market and these approaches differ in many parameters such as accuracy, cost, speed and simplicity. In general, tests performed in the lab (Mass spectrometry, High pressure liquid chromatography, Enzyme linked immunosorbent assay, etc.) are more accurate but tend to be time consuming, costly and require complex infrastructure in the form of bulky machinery and trained personnel. In contrast, portable assays (for example, lateral flow immunoassays) are userfriendly but have limited accuracy and normally lack the ability to perform quantitative analysis.

Optical biosensors have great potential as high-quality biochemical sensors, particularly, PIC biosensors that are based on the interaction between an evanescent optical field and a specific sample. PIC technology can multiplex a large number of sensors on a small chip, requires the use of a small sample volume for sensing several analytes, and enables tight control over the sensitivity (dynamic range) of the measurement.

In order to use PICs as biosensors for specific molecules of interest in a sample, one general physical concept of operation can be described as follows:

1. An optical device on a PIC is coated with capture agents capable of capturing a specific molecule of interest.
2. Light is coupled to and from the device to read its spectral signature.
3. The device is being exposed to a sample which might contain the molecule of interest.
4. In case the molecule of interest is present in the sample, it will bind to the capture agents and change the spectral signature of the device to indicate the presence of the molecule in the sample.

PIC based bio-sensing can be realized using various platforms like nano-plasmonics, silicon photonics and more. Each platform exploits the inherent advantages of light but differs in the use of materials, manufacturing methods and operation scheme. Such sensors can be highly accurate and fast and can also be multiplexed together on a single chip to enable simultaneous detection of several analytes. Other optional advantages are portability and the ability to use minute sample sizes. These benefits render the use of on-chip optical detection platforms attractive for diagnostics in various fields.

Nevertheless, there are several technological challenges which prevent the widespread use of on-chip optical biosensors. Two main challenges are:

1) The common use of expensive materials and manufacturing processes which render them less suitable for disposable sensors.
2) The need for intricate light coupling to the device in order to read its output which prevents quick analysis of samples.

In the following paragraphs, we will address both issues.

SUMMARY

There is provided a polymer based photonic integrated circuit (PIC) comprising:

a first polymeric layer, the first polymeric layer having a refractive index of from 1.3 to 1.8 at a wavelength of 1300 nm; and a second polymeric layer on the first polymeric layer, the second polymeric layer having a refractive index of from 1.4 to 1.9 at a wavelength of 1300 nm and an optical loss of at most 10 dB/cm at a wavelength of 1300 nm, wherein the difference between the refractive index of the first polymeric layer and the refractive index of the second polymeric layer is at least 0.1 at a wavelength of 1300 nm;

wherein an interface between the first polymeric layer and the second polymeric layer is patterned with a relief pattern to form a plurality of optical elements; and wherein the plurality of optical elements comprises an I/O grating, a 2D waveguide, and a spectral shaping element.

The plurality of optical elements may comprise connected optical elements forming an optical device.

There is also provided polymer based photonic integrated circuit (PIC) comprising:

a first polymeric layer on the substrate; and a second polymeric layer on the first polymeric layer, wherein an interface between the first polymeric layer and the second polymeric layer is patterned with a relief pattern to form a plurality of optical elements, wherein the plurality of optical elements comprise connected optical elements forming an optical device, and wherein the optical device comprises an I/O grating, a 2D waveguide, and a spectral shaping element.

The plurality of optical elements may comprise one or more optical elements selected from the group consisting of: I/O gratings, tapered waveguides, waveguides, 2D waveguides, waveguide based optical splitters, waveguide based optical couplers, and spectral shaping elements.

The polymers used for generating the PIC may be selected from the group consisting of: UV curable resins, polyimides, and sol-gels.

The first polymeric layer may:

be or comprise a hybrid organic-inorganic polymer;

be formed from a hybrid organic-inorganic polymer sol-gel;

be or comprise OrmoStamp; or be or comprise OrmoClearFX.

The second polymeric layer may be or comprise a polyimide.

The relief pattern may have a depth of from 300 nm to 2000 nm.

Features of the relief pattern may have widths perpendicular to the direction of light wave travel of from 800 nm to 30,000 nm.

The spectral shaping elements may be selected from the group consisting of: interferometers, resonators, Mach-Zehnder Interferometers (MZI), and ring resonators.

The spectral shaping element may include a curved waveguide having a radius of less than 300 μm.

The PIC may further comprise an anchor device for alignment of the PIC with respect to a reader.

The relative locations of the anchor device and the optical device may identify the PIC.

The PIC may further comprise a second anchor device wherein the relative locations of the anchor device and the second anchor device identify the PIC.

The spectral shaping element may be (directly or indirectly) coated with capture agents capable of capturing a specific molecule of interest.

The capture agents may be selected from the group consisting of: antibodies or their fragments, aptamers/peptide nucleic acids and their chemical derivatives, somamers, enzymes, peptides, molecularly imprinted polymers, cells, and DNA.

The molecule of interest may be selected from the group consisting of: proteins, enzymes, small molecules, peptides, nucleic acids (DNA or RNA), mammalian cells, microorganisms, and viruses.

The PIC may further comprise an additional spectral shaping element, wherein the additional spectral shaping element is coated with additional capture agents capable of capturing an additional specific molecule of interest, and wherein the capture agents and the additional capture agents are different capture agents and the specific molecule of interest and the additional specific molecule of interest are different molecules.

The PIC may further comprise a layer of a dielectric material on the first polymeric layer, optionally wherein the thickness of the dielectric layer is from 5 nm to 40 nm thick.

There is also provided a polymer based photonic integrated circuit (PIC) comprising:

a substrate;

a first polymeric layer on the substrate; and a second polymeric layer on the first polymeric layer, wherein the first polymeric layer is formed from OrmoStamp and/or OrmoClearFX;

wherein the second polymeric layer is or comprises a polyimide e.g. VTEC-1388; and wherein an interface between the first polymeric layer and the second polymeric layer is patterned with a relief pattern to form a plurality of optical elements.

The PIC may further comprise one or more or all of the features of any other PIC described herein.

There is also provided a polymer based photonic integrated circuit (PIC) comprising:

a first polymeric layer, the first polymeric layer having a refractive index of from 1.4 to 1.9 at a wavelength of 1300 nm; and wherein an interface of the first polymeric layer is patterned with a relief pattern to form a plurality of optical elements; and wherein the plurality of optical elements comprises an I/O grating, a 2D waveguide, and a spectral shaping element.

The PIC may further comprise one or more or all of the features of any other PIC described herein.

The PICs described herein may further comprise a substrate; the first polymeric layer may be on the substrate.

There is also provided a method of manufacturing a polymer based photonic integrated circuit (PIC) comprising:

providing a first polymeric layer having a refractive index of from 1.4 to 1.9 at a wavelength of 1300 nm;

providing a second polymeric layer on the first polymeric layer, the second polymeric layer having a refractive index of from 1.4 to 1.9 at a wavelength of 1300 nm and an optical loss of at most 10 dB/cm at a wavelength of 1300 nm; and patterning an interface between the first polymeric layer and the second polymeric layer with a relief pattern to form a plurality of optical elements, wherein the difference between the refractive index of the first polymeric layer and the refractive index of the second polymeric layer is at least 0.1 at a wavelength of 1300 nm.

There is also provided a method of manufacturing a polymer based photonic integrated circuit (PIC) comprising:

providing a first polymeric layer;

providing a second polymeric layer; and patterning an interface between the first polymeric layer and the second polymeric layer with a relief pattern to form a plurality of optical elements, wherein the plurality of optical elements comprises connected optical elements forming an optical device, and wherein the optical device comprises an I/O grating, a 2D waveguide, and a spectral shaping element.

The patterning of an interface between the first polymeric layer and the second polymeric layer with a relief pattern to form at least one optical element may be achieved by providing the first polymeric layer by spin coating a layer of sol-gel on a substrate and imprinting the sol-gel using a mould and then curing the sol-gel.

The curing of the sol-gel may be achieved by a UV curing process.

The relief pattern may have a depth of from 100 nm to 2000 nm.

Features of the relief pattern may have widths perpendicular to the direction of light wave travel of from 800 nm to 30,000 nm.

The at least one optical element may include a curved waveguide having a radius of less than 300 μm.

The providing of a second polymeric layer on the first polymeric layer may be achieved by spin coating a solution of a polymer on the patterned first polymeric layer.

There is also provided a method of manufacturing a polymer based photonic integrated circuit (PIC) comprising:

providing a first polymeric layer;

patterning an interface of the first polymeric layer with a relief pattern to form a plurality of optical elements, wherein the plurality of optical element comprises connected optical elements forming an optical device, and wherein the plurality of optical elements comprises an I/O grating, a 2D waveguide, and a spectral shaping element.

There is also provided a method of optical bio-sensing comprising:

providing a polymer based photonic integrated circuit (PIC) comprising a first polymeric layer, wherein an interface of the first polymeric layer is patterned with a relief pattern to form a plurality of optical elements, wherein the plurality of optical elements comprise connected optical elements forming an optical device, wherein the optical device comprises an I/O grating, a 2D waveguide and a spectral shaping element, and wherein the spectral shaping element is coated with capture agents capable of capturing a specific molecule of interest;

coupling light to and from the optical device to read the spectral signature of the optical device;

exposing the capture agents to a sample;

reading the spectral signature of the optical device; and determining whether the specific molecule of interest is present in the sample by monitoring for a change in the spectral signature of the optical device due to a binding event between the specific molecule of interest and the capture agent.

There is also provided a method of reading a photonic integrated circuit (PIC) comprising an optical device comprising I/O optical ports, the method comprising:

providing a reading device capable of interfacing with the PIC, the reading device comprising:

a. a light source connected to an input optical waveguide;

b. an optical detector connected to an output optical waveguide;

c. a motorized stage and/or a motorized arm configured to enable the I/O waveguides of the reading device to operably connect with the I/O ports of the optical device of the PIC; and d. an electrical control circuit;

wherein the I/O optical waveguides are located at a distance which corresponds to a distance between I/O optical ports of the optical device of the PIC; and accessing the optical device of the PIC using the motorized stage and/or the motorized arm to align the I/O optical waveguides and the I/O optical ports of the optical device of the PIC.

The method may further comprise aligning the I/O waveguides and the I/O optical ports of the PIC automatically by coupling light from the light source into an optical device of the PIC using the input optical waveguide, while scanning the PIC's surface and monitoring for a reflected signal coupled out to the optical detector through the output waveguide.

The method may further comprise detecting anchor devices of the PIC for alignment of the PIC with respect to the reader and/or for identifying the PIC.

The I/O ports of the optical device of the PIC may be selected from the group consisting of: optical gratings, inverse couplers and cleaved waveguides.

The method may be for optical bio-sensing purposes, and the optical device of the PIC may comprise a spectral shaping element coated with capture agents capable of capturing a specific molecule of interest, and the method may further comprise the steps of:

exposing the capture agents to a fluid sample; and moving the motorized stage or the motorized arm to enable repeated monitoring of the optical device's spectral signature, indicating the concentration of the molecule of interest within the fluid sample.

The capture agents may be selected from the group consisting of: antibodies or their fragments, aptamers/peptide nucleic acids and their chemical derivatives, somamers, enzymes, peptides, molecularly imprinted polymers, cells, and DNA.

The molecule of interest may be selected from the group consisting of: proteins, enzymes, small molecules, peptides, nucleic acids (DNA or RNA), mammalian cells, microorganisms, and viruses.

The fluid sample may comprise or be composed of bodily fluids selected from the group consisting of: blood, urine, and saliva.

The fluid sample may comprise or be composed of fluids selected from the group consisting of: water and milk.

The method may further comprise measuring the rate of change of the spectral signature to determine the concentration of the molecule of interest in the fluid sample.

The PIC may further comprise an additional optical device comprising I/O optical ports and an additional spectral shaping element, wherein the additional spectral shaping element may be coated with additional capture agents capable of capturing an additional specific molecule of interest, and wherein the capture agents and the additional capture agents may be different capture agents and the specific molecule of interest and the additional specific molecule of interest may be different molecules; and the method may further comprise monitoring of the additional optical device's spectral signature, indicating the concentration of the additional molecule of interest within the fluid.

The method may further comprise repeated sequential reading of the spectral signature of the optical device and the additional optical device.

There is also provided a photonic integrated circuit (PIC) reading device for reading a PIC comprising an optical device comprising I/O optical ports, the reading device comprising:

a. a light source connected to an input optical waveguide;

b. an optical detector connected to an output optical waveguide;

c. a motorized stage and/or a motorized arm configured to enable the I/O waveguides of the reading device to operatively connect with the I/O optical ports of the optical device of the PIC; and d. an electrical control circuit;

e. wherein the I/O optical waveguides are located at a distance which corresponds to the distance between the I/O optical ports of the optical device of the PIC.

The reading device may further comprise an electrical control circuit, wherein the electrical control circuit may be configured to determine whether a specific molecule of interest is present in a sample by monitoring for a change in a spectral signature of the optical device due to a binding event between a specific molecule of interest and a capture agent.

There is also provided a system comprising a photonic integrated circuit (PIC) reading device according to as described above and a PIC, the PIC comprising an optical device comprising I/O optical ports.

The PIC may comprise an anchor device comprising I/O optical ports, wherein the I/O optical ports of the optical device of the PIC and the I/O optical ports of the anchor device are both located at the distance which corresponds to the distance between the I/O optical waveguides.

The PIC of the system may be any PIC described herein.

There is also provided a method of reading a photonic integrated circuit (PIC) comprising a first optical device comprising I/O optical ports and a second optical device comprising I/O optical ports, the method comprising:

providing a reading device capable of interfacing with the PIC, the reading device comprising:

a. a light source connected to an input optical waveguide;

b. an optical detector connected to an output optical waveguide;

c. a motorized stage and/or a motorized arm configured to enable the I/O waveguides of the reading device to operably connect with the I/O ports of the first optical device and the second optical device of the PIC; and d. an electrical control circuit;

accessing and determining the relative location of the first optical device and the second optical device of the PIC using the motorized stage and/or the motorized arm to align the I/O optical waveguides and the I/O optical ports of the PIC; and identifying the PIC from the relative location of the first optical device and the second optical device.

The first optical device may be an anchor device and/or the second optical device may be an anchor device.

Determining the relative location of the first optical device and the second optical device may comprise determining a 2D relative location (ΔX and ΔY) of the first and second optical devices.

There is also provided a method of encoding a photonic integrated circuit (PIC) comprising a first optical device comprising I/O optical ports and a second optical device comprising I/O optical ports, the method comprising:

positioning the first optical device and the second optical device of the PIC so as to identify the PIC from the relative location of the first optical device and the second optical device.

The first optical device may be an anchor device and/or the second optical device may be an anchor device.

Determining the relative location of the first optical device and the second optical device may comprise determining a 2D relative location (ΔX and ΔY) of the first and second optical devices.

There is also provided a polymer based photonic integrated circuit (PIC) comprising:

a first polymeric layer; and a second polymeric layer on the first polymeric layer, wherein an interface between the first polymeric layer and the second polymeric layer is patterned with a relief pattern to form at least two optical devices and wherein the relative location of the first optical device and the second optical device identify the PIC.

There is also provided a computer readable medium having instructions stored thereon which, when executed by a processor, cause the performance of a method described herein.

There is also provided a computer program including instructions which, when executed by a processor, cause the performance of a method described herein.

There is also provided a system including at least one processor and a computer readable medium, wherein the computer readable medium has instructions stored thereon which, when executed by the at least one processor, cause the system to perform a method described herein.

There is also provided a cassette comprising:

a mounting for removably mounting the cassette to a reader;

a photonic integrated circuit (PIC) comprising an input grating, a 2D waveguide, a spectral shaping element, and an output grating, and wherein when the cassette is mounted in the reader:

the input grating is operably connectable with an input waveguide of the reader and the output grating is operably connectable with an output waveguide of the reader;

a fluid inlet, wherein the fluid inlet is fluidly connected to the PIC; and at least one pump component wherein when the cassette is mounted in the reader the pump component and the reader form a pump for pumping fluid from the fluid inlet to the PIC.

The at least one pump component may comprise a flexible tube fluidly connecting the fluid inlet and the PIC.

The at least one pump component may comprise a guide member.

When the cassette is mounted in the reader the flexible tube may be compressible between the guide member and a rotor of the reader to form a peristaltic pump.

The PIC may be a PIC as described herein.

There is also provided a photonic integrated circuit (PIC) reading device comprising:

a mounting for removably receiving a cassette including a PIC, an input waveguide;

an output waveguide;

wherein when the cassette is mounted in the reader:

the input waveguide is operably connectable with an input grating of the PIC and the output waveguide is operably connectable with an output grating of the PIC, at least one pump component wherein when the cassette is mounted in the reader the pump component and the cassette form a pump for pumping fluid from a fluid inlet of the cassette to the PIC of the cassette.

The at least one pump component may be a rotor and when the cassette is mounted in the reader the rotor may compress a flexible tube of the cassette against a guide member of the cassette to form a peristaltic pump.

There is also provided a system comprising a cassette as described herein and a photonic integrated circuit (PIC) reading device as described herein.

There is also provided a Polymer based photonic integrated circuit (PIC) comprising: a substrate; and one or more layers of polymeric thin films stacked on said substrate; one or more of said layers (Core Layers) configured to confine and conduct light; wherein at least one of said films is patterned with a relief pattern to form a plurality of optical elements on said one or more Core Layers; wherein said plurality of optical elements comprise connected optical elements forming one or more optical devices; wherein at least one of said one or more optical devices comprises at least one I/O grating, a 2D Waveguide and a Spectral shaping element.

The optical elements may be selected from the group consisting of: I/O Gratings, Tapered waveguides, Waveguides, 2D waveguides, Waveguide based optical splitters, Waveguide based optical couplers, and Spectral shaping elements.

The polymers used for generating the PIC may be selected from the group consisting of: UV curable resins, polyimides and sol-gels.

The Spectral shaping elements may be selected from the group consisting of: interferometers, resonators, Mach-Zehnder Interferometers (MZI) and Ring resonators.

The PIC may further comprise at least one anchor device for rapid alignment of the PIC with respect to a reader and for identifying the specific PIC design.

There is also provided a method of optical bio-sensing comprising the steps of: providing a Polymer based photonic integrated circuit (PIC) comprising a substrate and one or more layers of polymeric thin films stacked on said substrate; one or more of said layers (Core Layers) configured to confine and conduct light; wherein at least one of said films is patterned with a relief pattern to form a plurality of optical elements on said one or more Core Layers; wherein said plurality of optical elements comprise connected optical elements forming one or more optical devices; wherein at least one of said optical devices comprises at least one I/O grating, a 2D Waveguide and a Spectral shaping element; wherein at least one of said optical devices' spectral shaping element is coated with capture agents capable of capturing a specific molecule of interest; coupling light to and from said at least one optical device to read the spectral signature of said optical device; exposing said at least one optical device to a sample; reading the spectral signature of said at least one optical device; and determining whether the specific molecule of interest is present in said sample by detecting a change in the spectral signature of said at least one optical device due to a binding event between the specific molecule and the capture agents.

The capture agents may be selected from the group consisting of: Antibodies, Aptamers, Peptides and DNA.

The one or more molecule of interest may be selected from the group consisting of: a protein, enzyme, nucleic acid, DNA and RNA.

The at least one optical device may comprise two or more optical devices and wherein at least two of said two or more optical devices may be treated with different capture agents configured to capture different molecules.

The sample may be composed of bodily fluids selected from the group consisting of: blood, urine and saliva.

The sample may be composed of fluids selected from the group consisting of: water and milk.

The method may further comprise measuring the rate of change of said spectral signature to determine the concentration of said molecule of interest in said sample.

There is also provided a photonic integrated circuit (PIC) reading device capable of interfacing with various PICs comprising optical devices, comprising: a light source connected to an input optical waveguide; an optical detector connected to an output optical waveguide; one of a motorized stage and a motorized arm configured to enable the I/O waveguides of the reading device to reach all the optical devices on the PIC; and an electrical control circuit; wherein the I/O optical waveguides are located at a distance which corresponds to the distance between the I/O optical ports of at least one of said optical device on the PIC.

There is also provided a method of reading a photonic integrated circuit (PIC) comprising: providing a reading device capable of interfacing with various PICs comprising one or more optical devices, comprising: a light source connected to an input optical waveguide; an optical detector connected to an output optical waveguide; one of a motorized stage and a motorized arm configured to enable the I/O waveguides of the reading device to reach all the optical devices on the PIC; and an electrical control circuit; wherein the I/O optical waveguides are located at a distance which corresponds to the distance between the I/O optical ports of at least one of said one or more optical device on the PIC; and accessing at least one of said one or more devices on the PIC surface using said one of a motorized stage and a motorized arm to align between the I/O optical waveguides and the I/O optical ports on the PIC.

The method may further comprise aligning the I/O waveguides and the device's ports automatically by coupling light from said light source into an optical device on the PIC using the input optical waveguide and, while scanning the PIC's surface and monitoring a reflected signal coupled out to the optical detector through the output waveguide.

The method may further comprise using anchor devices on the PIC for rapid alignment of the PIC with respect to the reader and for identifying the specific PIC design.

The I/O ports on the PIC may be selected from the group consisting of: optical gratings, inverse couplers and cleaved waveguides.

The method may be for optical bio-sensing purposes, wherein at least one of said one or more optical device on said PIC has been treated with capture agents configured to capture a specific molecule, wherein the reading device further comprises a fluidics channel, the method further comprising the steps of: a. flowing fluid sample over the PIC surface and exposing the optical devices to the presence of the molecule of interest; and b. moving said one of said motorized stage and motorized arm across said one or more optical devices to enable repeated monitoring of said optical devices' spectral signature, indicating the concentrations of said molecule of interest.

The capture agents may be selected from the group consisting of: Antibodies, Aptamers, Peptides and DNA.

The molecule of interest may be selected from the group consisting of: a protein, enzyme, nucleic acid, DNA and RNA.

The sample may be composed of bodily fluids selected from the group consisting of: blood, urine and saliva.

The sample may be composed of fluids selected from the group consisting of: water and milk.

The method may further comprise measuring the rate of change of said spectral signature to determine the concentration of said molecule of interest in said sample.

The one or more optical device may comprise two or more optical devices wherein at least two of said two or more optical devices have been treated with different capture agents configured to capture different molecules.

The one or more optical device may comprise two or more optical devices and at least two of said two or more optical devices may have been treated with different capture agents configured to capture different molecules.

BRIEF DESCRIPTION OF THE DRAWINGS

For better understanding of the invention and to show how the same may be carried into effect, reference will now be made, purely by way of example, to the accompanying drawings.

With specific reference now to the drawings in detail, it is stressed that the particulars shown are by way of example and for purposes of illustrative discussion of the preferred embodiments of the present invention only, and are presented in the cause of providing what is believed to be the most useful and readily understood description of the principles and conceptual aspects of the invention. In this regard, no attempt is made to show structural details of the invention in more detail than is necessary for a fundamental understanding of the invention, the description taken with the drawings making apparent to those skilled in the art how the several forms of the invention may be embodied in practice. In the accompanying drawings.

DETAILED DESCRIPTION OF THE DISCLOSURE

Definitions

Figure 1:
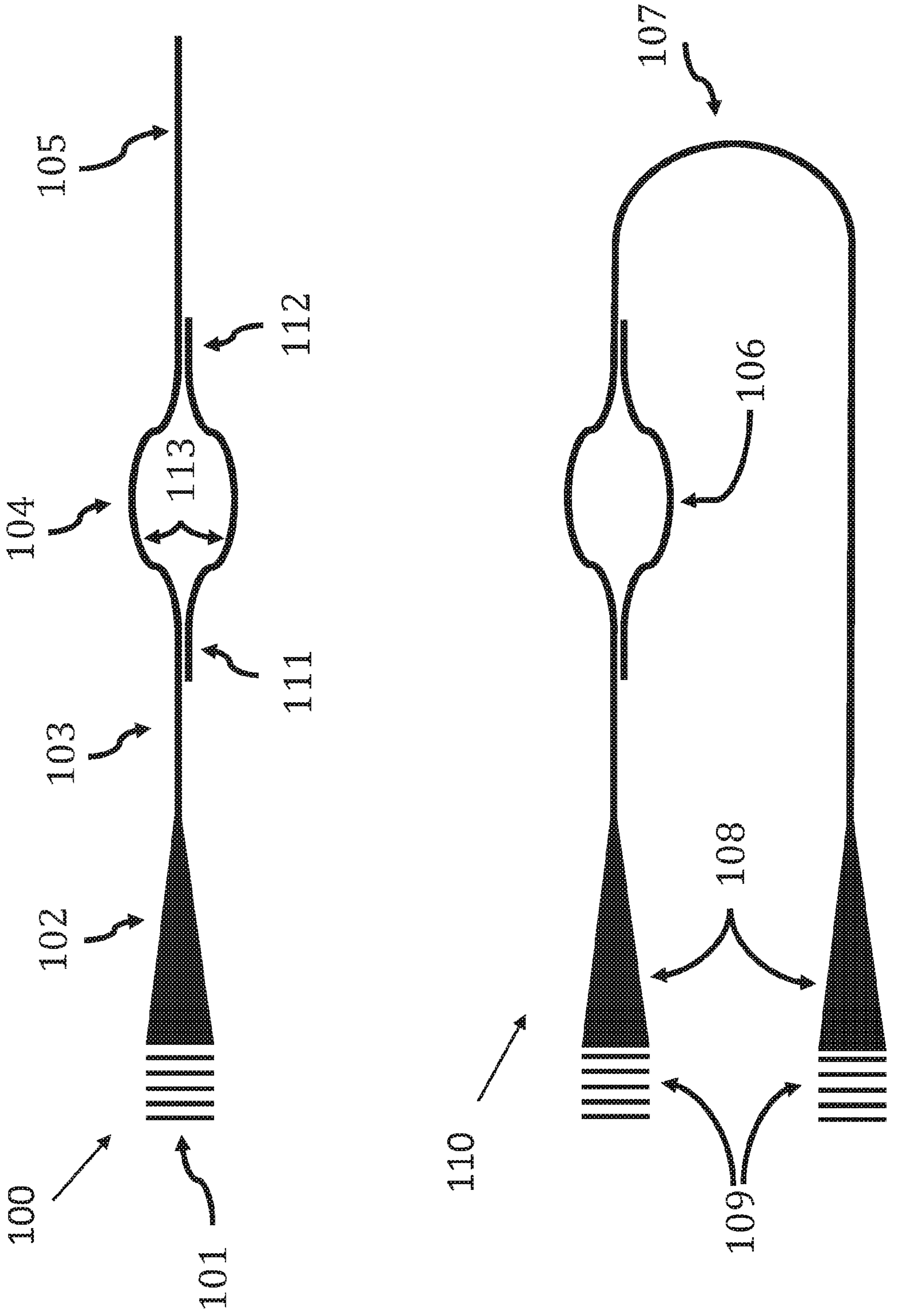
FIG. 1 presents an example PIC (Top view) composed of several optical devices, each comprising several optical elements.

Optical element—A structure which has a specific optical functionality.

Optical device—A combination of connected optical elements which are combined together synergistically to offer a more complex functionality.

Optical Mach-Zehnder interferometer (MZI)—An optical element which splits an optical beam to two paths/arms and combines them to measure the phase difference between these two paths/arms at the output.

Asymmetric Mach-Zehnder interferometer (aMZI)—an MZI with two paths/arms with different lengths.

Ring Resonator (RR)—An optical element which comprises a round waveguide

Optical Waveguide—An optical element which confines light and guides it.

2D optical waveguide—An optical element which confines light in two dimensions and guides it.

Waveguide Core—Part of the waveguide which confines and conducts light along its path (In many cases has an increased refractive index compared to its surrounding.)

Waveguide Cladding—Part of the waveguide which surrounds the Waveguide Core.

Core layer—In a stack of layers made of different materials, a core layer will be defined here as a layer which is able to confine and conduct light along its path. In many cases this layer will have an increased refractive index compared to its surrounding layers or surroundings.

Layer—a continuous region of material spread over a plane. A layer may have a relief pattern formed therein. Discontinuous regions of material on a surface or plane do not constitute a layer. A layer is usually continuous in every cross section taken perpendicular to the plane of the layer. A layer is usually continuous in cross sections having a normal parallel to the plane of the layer. The thickness of the layer might vary along a cross section perpendicular to the plane of the layer.

Waveguide based optical splitter—an optical element used to split an optical mode from one waveguide to two or more waveguides.

Waveguide based optical coupler—an optical element used to couple optical modes from two or more waveguides into a single waveguide.

Optical Tapered Waveguide—an element which changes the spatial distribution of a beam of light.

Optical Grating coupler—An optical element having a periodic pattern which diffracts light to one or more angles. Used for coupling light in/out of photonic integrated circuits.

Thermoelectric cooler (TEC)—an electrical device which produces a voltage dependent heat gradient between two types of materials (Peltier effect). It can be used to change the temperature at a specific location.

On—directly or indirectly on. Accordingly, e.g. where a layer or material is disclosed as "on" another layer or material, this is a disclosure that the layer or material is directly on the other layer or material and a disclosure that the layer or material is indirectly on the other layer or material.

Capture agents—agents capable of selectively capturing or binding to a specific molecule of interest. The phrase "capture agents" does not require that multiple different capture agents are present.

The present disclosure provides a low-cost polymer-based PIC. Each PIC is composed of several optical devices. Every device is composed of several optical elements, for example:

Grating couplers to couple light in and out of the chip.

Optical tapers to control the spatial distribution of the optical mode.

Optical waveguides to guide the light inside the chip.

Optical splitter/couplers to split or combine optical modes.

Spectral shaping optical elements with specific spectral signatures to control the functionality of the device.

In various applications, PICs can contain many independent optical devices, each requiring separate input and output (I/O) lines. In addition, in applications like sensing, where it is necessary to replace PICs repeatedly or where hopping between specific devices on the chip is advantageous, a need exists for a flexible method for locating and operating specific devices, regardless of their location on the PIC. These challenges are addressed with our compatible reader described herein below.

The present disclosure provides a method for designing and manufacturing polymer PICs for all purposes but with an emphasis on sensing applications. In addition, we provide a compatible reading device which enables high flexibility and provides a framework for a low-cost PIC ecosystem.

The Polymeric Chip:

The disclosure provides a polymer based photonic integrated circuit (PIC) comprising: a first polymeric layer, the first polymeric layer having a refractive index of from 1.3 to 1.8 at a wavelength of 1300 nm; and a second polymeric layer on the first polymeric layer, the second polymeric layer having a refractive index of from 1.4 to 1.9 at a wavelength of 1300 nm and an optical loss of at most 10 dB/cm at a wavelength of 1300 nm, wherein the difference between the refractive index of the first polymeric layer and the refractive index of the second polymeric layer is at least 0.1 at a wavelength of 1300 nm; wherein an interface between the first polymeric layer and the second polymeric layer is patterned with a relief pattern to form a plurality of optical elements; and wherein the plurality of optical elements comprises an I/O grating, a 2D waveguide, and a spectral shaping element.

The plurality of optical elements may comprise connected optical elements forming an optical device.

The disclosure also provides polymer based photonic integrated circuit (PIC) comprising: a first polymeric layer on the substrate; and a second polymeric layer on the first polymeric layer, wherein an interface between the first polymeric layer and the second polymeric layer is patterned with a relief pattern to form a plurality of optical elements, wherein the plurality of optical elements comprise connected optical elements forming an optical device, and wherein the optical device comprises an I/O grating, a 2D waveguide, and a spectral shaping element.

Accordingly, such PICs have complex optical devices providing advanced functionality, not achieved before. Yet further, such PICs may be fabricated at relatively low cost.

Inclusion of a I/O grating may be particularly advantageous. In particular, the use of optical gratings can make the PIC substantially easier to use. When, for example, butt coupling or cleaved waveguides are used to couple light into a PIC precise alignment of a waveguide of the PIC and a waveguide of a reader is required. However, use of optical gratings can enable coupling between a PIC and a reader with a useful degree of positional tolerance, thereby making the PIC easier to use.

However, provision of a I/O grating and 2D waveguides and spectral shaping elements in the same polymer PIC has proved challenging to date. In particular, these optical elements have a wide range of widths (i.e. distance perpendicular to the direction of light wave travel in use). Accordingly, the disclosure provides PICs comprising optical devices comprising an I/O grating, a 2D waveguide, and a spectral shaping element.

In the field of integrated photonics, in order to generate complex designs, which include various optical elements, such as gratings, waveguides, spectral shaping elements, and more, other workers have turned to sophisticated fabrication techniques used to process semiconductors, or other complex techniques. These include photolithography, e-beam lithography, focused Ion beam, or even 3D printing with micro scale resolution. Such techniques have precise control of the patterned materials by selectively removing material from desired areas, leaving behind complex structures in a discontinuous film. These techniques are usually complex, expensive, and/or slow. The PICs and methods of manufacture presented herein implement a novel polymeric PIC based on a polymer layer(s) which include several optical elements (gratings, waveguides, and spectral shaping elements). These chips can be manufactured by scalable techniques such as imprinting, moulding, etc.

The plurality of optical elements may comprise one or more optical elements selected from the group consisting of: I/O gratings, tapered waveguides, waveguides, 2D waveguides, waveguide based optical splitters, waveguide based optical couplers, and spectral shaping elements.

The polymers used for generating the PIC may be selected from the group consisting of: UV curable resins, polyimides, and sol-gels.

The first polymeric layer may: be or comprise a hybrid organic-inorganic polymer; be formed from a hybrid organic-inorganic polymer sol-gel; be or comprise OrmoStamp; or be or comprise OrmoClearFX. Additionally or alternatively, the second polymeric layer may be or comprise a polyimide. It has been found that such materials can enable the convenient fabrication of PICs including relatively complex optical devices.

Particularly preferred PICs may comprise: a substrate; a first polymeric layer on the substrate; and a second polymeric layer on the first polymeric layer. The first polymeric layer may be formed from OrmoStamp and/or OrmoClearFX. The second polymeric layer may be or comprise a polyimide e.g. VTEC-1388. An interface between the first polymeric layer and the second polymeric layer may be patterned with a relief pattern to form a plurality of optical elements. It has been found that such materials can enable the convenient fabrication of PICs including relatively complex optical devices.

The first polymeric layer having a refractive index of at least 1.3, 1.4, 1.5, 1.6, or 1.7 at a wavelength of 1300 nm. The first polymeric layer having a refractive index of at most 1.8, 1.7, 1.6, 1.5, or 1.4 at a wavelength of 1300 nm. The second polymeric layer may have a refractive index of at least 1.4, 1.5, 1.6, 1.7, or 1.8 at a wavelength of 1300 nm. The second polymeric layer may have a refractive index of at most 1.9, 1.8, 1.7, 1.6, or 1.5 at a wavelength of 1300 nm. The difference between the refractive index of the first polymeric layer and the refractive index of the second polymeric layer may be at least 0.1, 0.15, 0.2, or 0.25 at a wavelength of 1300 nm. The first and/or second polymeric layer may have an optical loss of at most 10, 8, 6, 5, or 4 dB/cm at a wavelength of 1300 nm. As described herein the wavelength at which refractive index and/or optical losses is/are measured is generally 1300 nm; however, alternatively, the wavelength at which indexes and/or optical losses are measured may be 1400 nm or 1500 nm.

FIG. 1 presents an exemplary PIC (Top view) composed of two optical devices, each comprising several optical elements. The top device 100 is composed of a grating coupler 101 to serve as either the input or output coupler of the device, a tapered waveguide 102 to match the spatial distribution of the optical modes in the grating to the spatial distribution of the modes in the waveguide, a 2D waveguide 103 to conduct the light beam inside the chip, a Mach-Zehnder interferometer (MZI) 104 to control the spectral signature of the device and lastly, another waveguide 105 which directs the light further across the PIC. The MZI is composed of the following optical elements: Waveguide based optical splitter 111, waveguide based optical coupler 112 and two waveguides 113 which connect the optical splitter to the optical coupler.

Elements 111 and 112 can be used together to form an MZI as presented in the figure or in a standalone configuration for coupling/splitting optical modes. Another example of an optical device 110 is located at the bottom of FIG. 1. Here, the device consists of a MZI 106, a U-shaped waveguide 107, input/output tapered waveguides 108, and gratings 109. This way, the device can be interrogated (excited and read) from the same side.

Figure 2:
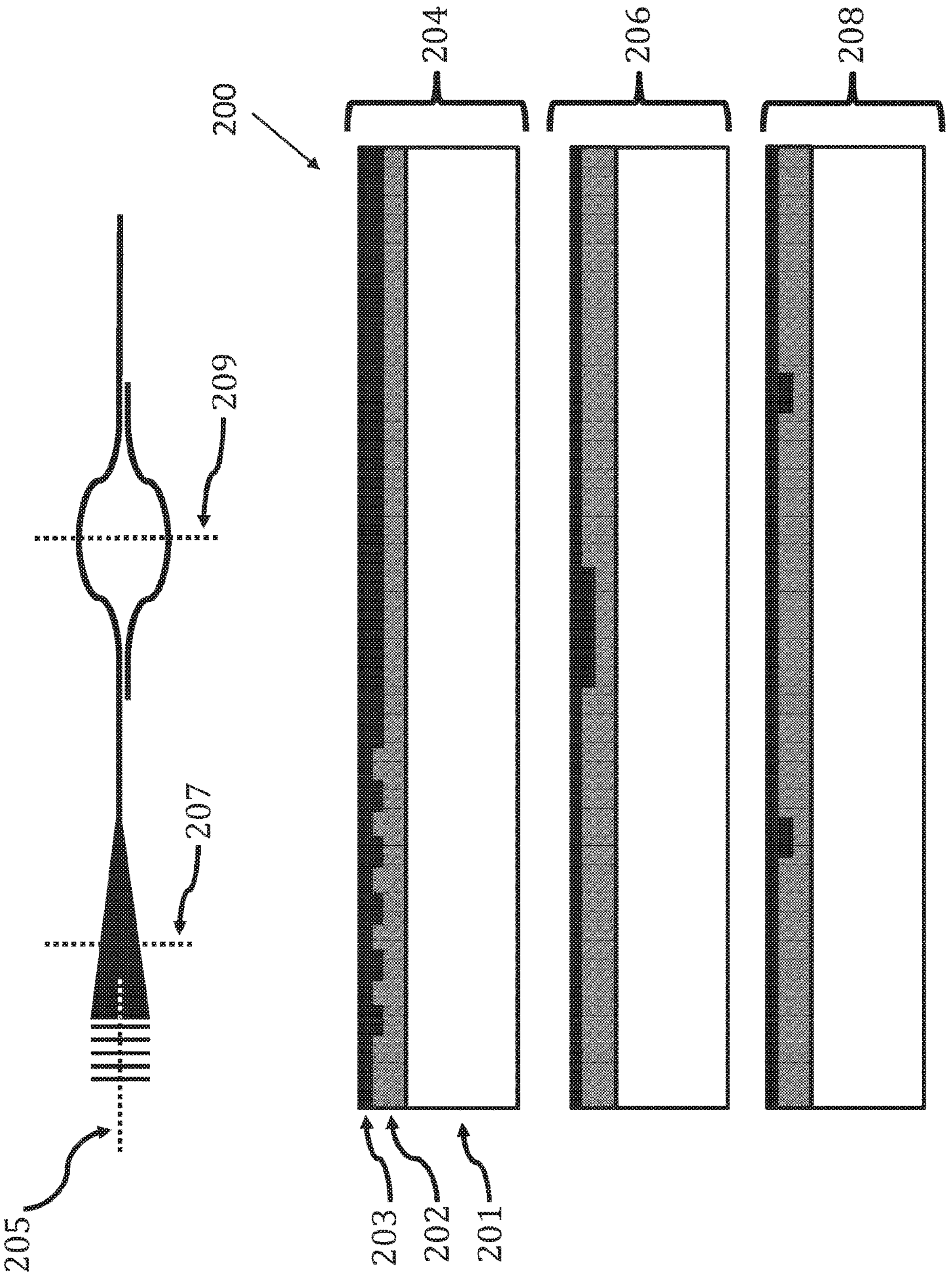
FIG. 2 depicts an example of the polymer based PIC platform (Cross section view at different locations)

A further example 200 of the polymer based PIC platform is depicted in FIG. 2. The PIC platform comprises a substrate 201 made of glass, or other material such as silicon, quartz, metal, polymer, etc. to supply mechanical support. Above the substrate, a polymer layer ('Polymer 1') with a relief pattern (202). On top of this layer lies another polymer layer with a complementary relief pattern and a higher refractive index ('Polymer 2') which serves as the 'core layer' (203). During the operation of the PIC, most of the light travels in the 'core layer' 203. The different relief patterns which are generated by moulding/casting/imprinting form different optical elements as in the following example:

204 is the cross section (side view) of the PIC at the grating coupler region (the cross-section location is marked with 205). 206 is the cross section (side view) of the PIC at the tapered waveguide region (the cross-section location is marked with 207). 208 is the cross section (side view) of the PIC at the MZI region (the cross-section location is marked with 209).

Figure 3:
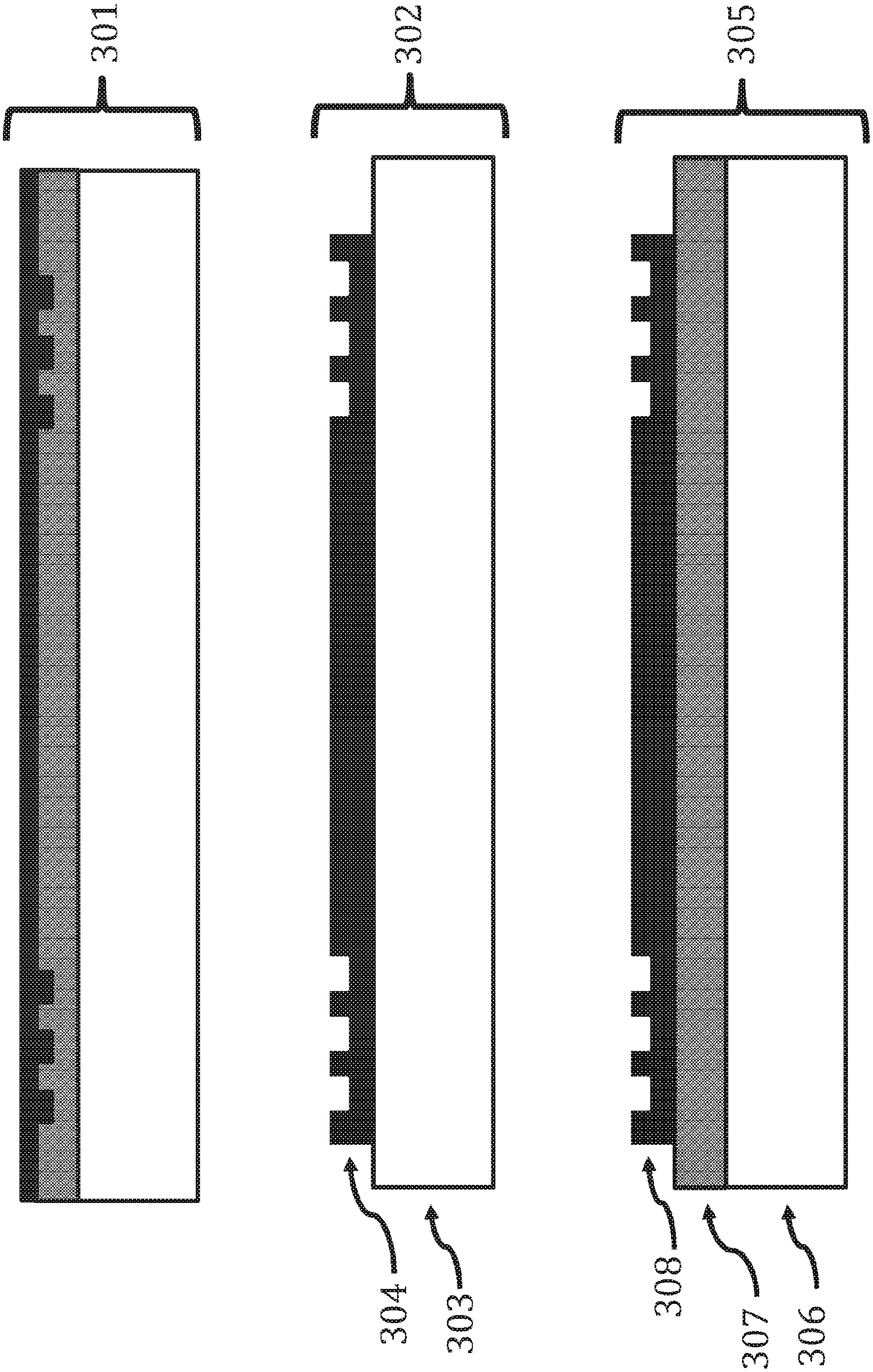
FIG. 3 presents other possible configurations for the PIC layer stack.
Figure 3B:
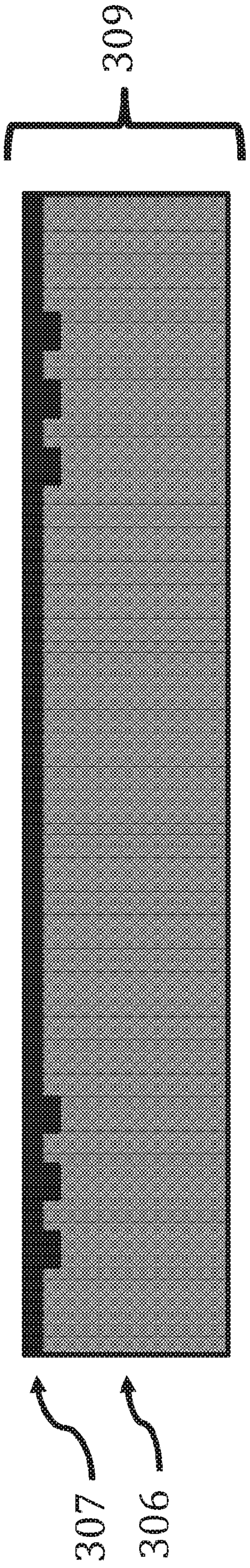
FIG. 3B shows a further possible configuration for the PIC layer stack.

FIGS. 3 and 3B present other possible configurations for the PIC layers stack. 301 shows the example described in FIG. 2.

302 shows a polymeric PIC composed of a substrate for mechanical support 303 and on top of the substrate lies a single polymer film 304 with a relief pattern generated by moulding/imprinting. This film should have a higher refractive index than the substrate and acts as the 'core layer'. As will be apparent, the interface of the first polymeric layer 304 which is patterned with a relief pattern to form a plurality of optical elements is a polymer-air interface.

305 shows a similar concept to 302 comprising a 'core layer' with relief pattern 308 and another polymer layer 307 with refractive index lower than the 'core layer', positioned between the substrate 306 and the 'core layer'. Again, the interface of the first polymeric layer which is patterned with a relief pattern 308 to form a plurality of optical elements is a polymer-air interface.

309 shows a further polymeric PIC 309 composed of a substrate 306 On the substrate 306 is a polymer layer 307 with a relief pattern generated by moulding/imprinting.

As an example, the polymer based PICs 302, 305 shown in FIG. 3 may comprise: a first polymeric layer 304, the first polymeric layer having a refractive index of from 1.3 to 1.8 at a wavelength of 1300 nm. An interface 308 of the first polymeric layer may be patterned with a relief pattern to form a plurality of optical elements. The plurality of optical elements may comprise an I/O grating, a 2D waveguide, and a spectral shaping element. These PICs 302, 305 may further comprise one or more or all of the features of any other PIC described herein.

The different relief patterns described in FIGS. 2, 3, and 3B, which are generated by moulding/casting/imprinting/etching, form different optical elements.

The PICs described herein may comprise a substrate, as illustrated. In such a case, the first polymeric layer may be (directly or indirectly) on the substrate. However, the disclosed PICs may not include a substrate.

The relief pattern may have a depth of from 100 nm to 2000 nm, alternatively the relief pattern may have a depth of from 300 nm to 2000 nm, from 300 nm to 900 nm, or from 600 nm to 700 nm. Additionally or alternatively, the relief pattern may have a depth of at most 2000 nm, 1500 nm, 1000 nm, 900 nm, or 700 nm. Additionally or alternatively, the relief pattern may have a depth of at least 100 nm, 200 nm, 300 nm, 400 nm, 500 nm, or 600 nm.

Using the methods described herein the PICs described herein may have spectral shaping elements including curved waveguides having a radius of less than 300 μm. Alternatively, the radius may be less than 1000, 900, 800, 700, 600, 500, 400, 200, or 100 μm. Even when such curved waveguides are used, the losses of the PICs described herein may be low, e.g. losses less than 10 dB/cm along the curved waveguide.

Additionally, using the methods described herein, PICs may be produced which have a wide range of widths of features in a relief pattern. For example, the relief pattern may have widths (i.e. perpendicular to the direction of light wave travel in use) of from 800 nm to 30,000 nm. Such features are particularly advantageous as they allow the formation of a large variety of optical components, which have widths which are substantially different, e.g. I/O gratings and MZIs.

The PIC may further comprise a layer of a dielectric material on the first polymeric layer, optionally wherein the thickness of the dielectric layer is from 5 nm to 40 nm thick. Such a layer of dielectric material may be advantageous, for example, the layer of dielectric material may help encapsulate the PIC and/or the layer of dielectric material may provide a particularly suitable surface for any capture agents indirectly on a spectral shaping element.

Figure 4:
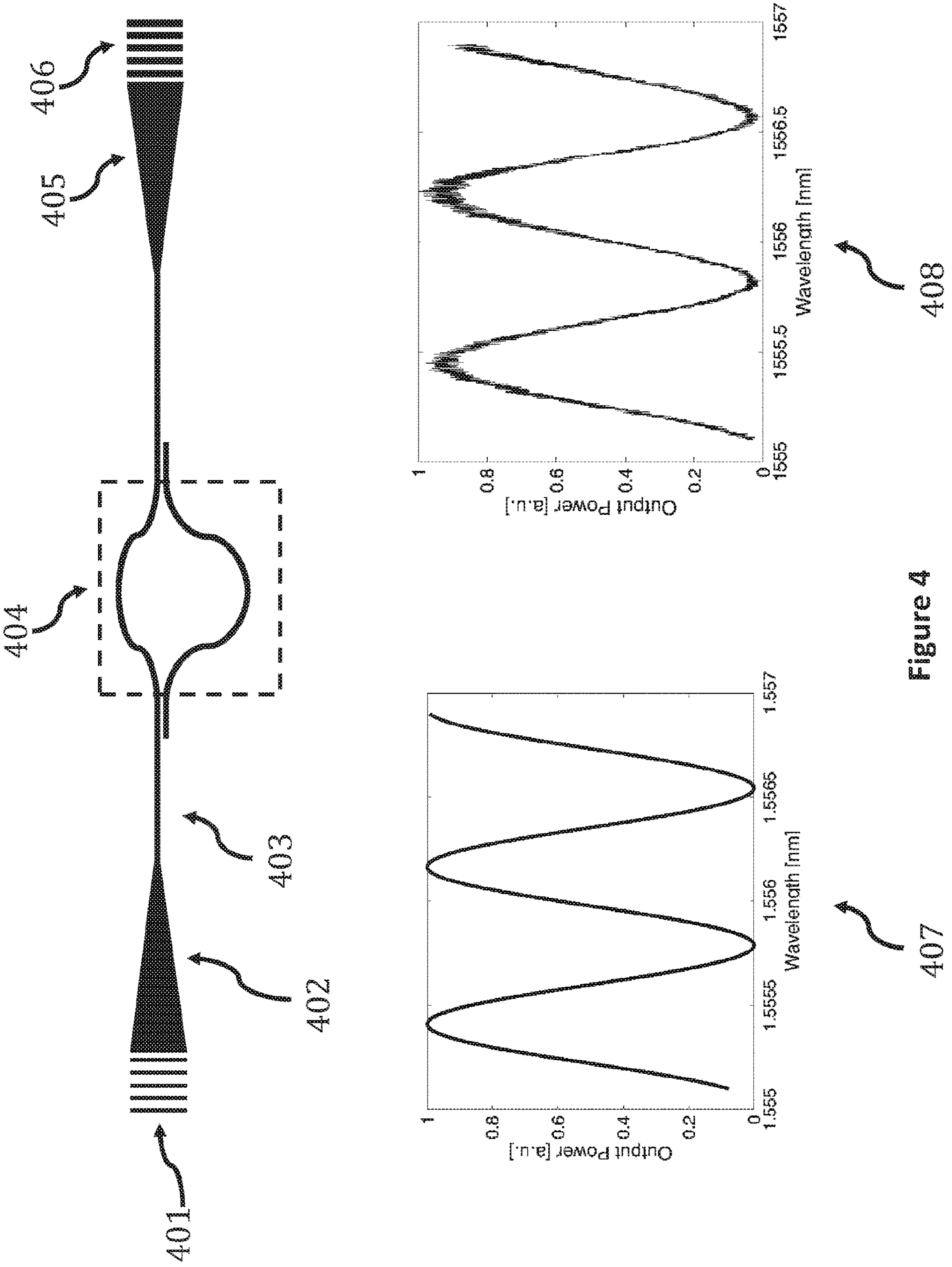
FIG. 4 shows a schematic top view, and the output spectrum, of an optical device composed of several optical elements.

FIG. 4 shows a schematic top view of another optical device composed of several optical elements. These include an input grating coupler 401, a tapered waveguide 402, a waveguide 403, an asymmetric Mach-Zehnder interferometer (aMZI) 404 (Spectral shaping element), a second tapered waveguide 405, and an output grating coupler 406. aMZI is an optical element composed of an optical splitter, two arms of different lengths, and an optical coupler which combines the two optical beams to achieve an interference pattern at the output. The theoretical output spectral response of an aMZI can be described using the following equation:

$$P_{out} = \cos^2\left(\frac{2\pi}{\lambda} * (n_{eff} * \Delta L) * \frac{1}{2}\right) \quad \text{Eq. 1}$$

Where λ is the operating wavelength, ΔL is the difference between the lengths of the two arms, and $n_{eff}$ is the effective refractive index of the optical beam inside the waveguide. 407 plots the output power as a function of the wavelength based on this equation. 408 presents an experimental output spectral response of such an optical device (including gratings, waveguides, tapered waveguides and aMZI) implemented on a polymeric PIC.

Figure 5:
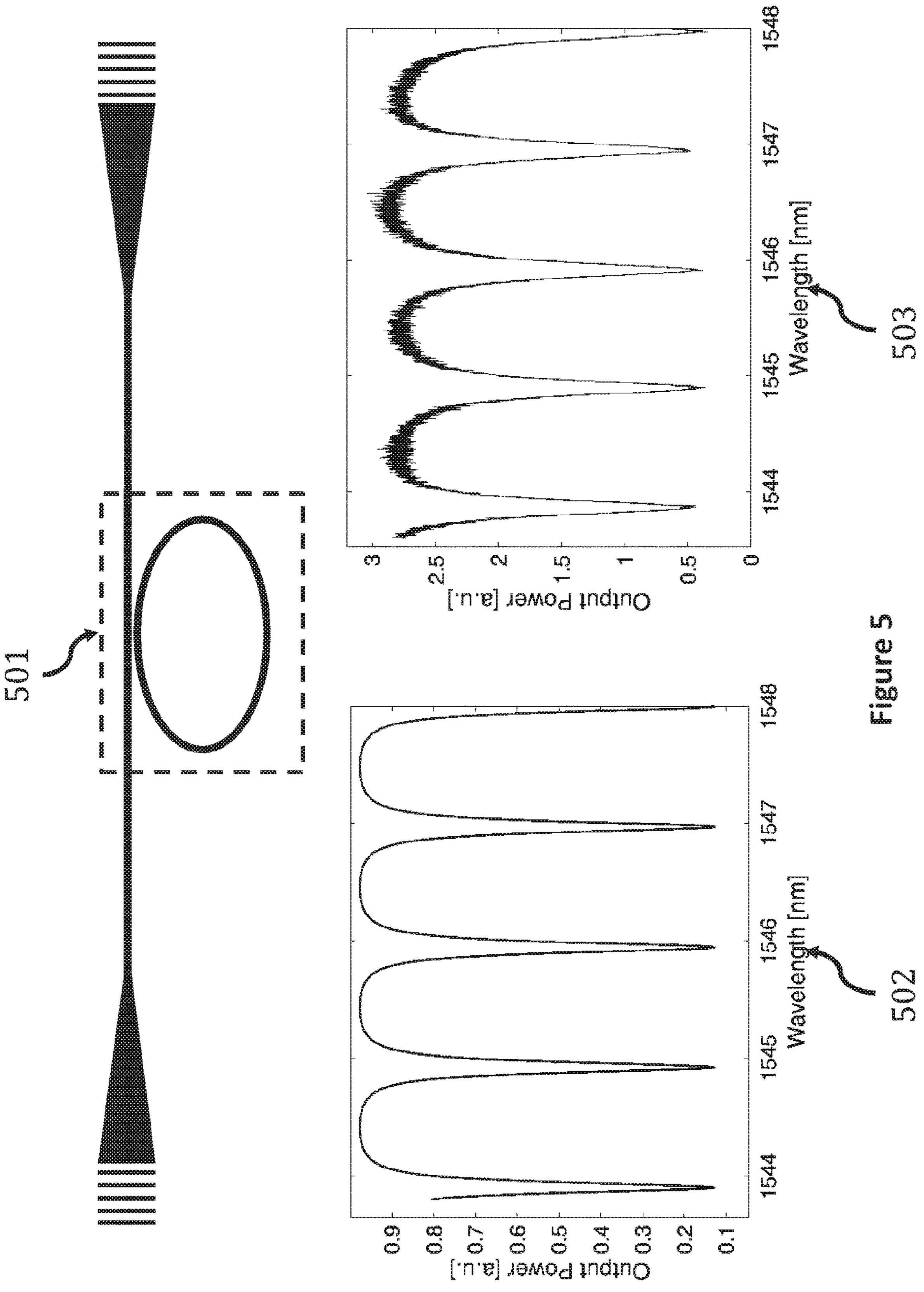
FIG. 5 presents an optical device similar to that of FIG. 4 but instead of an aMZI element, it utilizes a Ring Resonator (RR)

FIG. 5 presents another optical device similar to that of FIG. 4, but instead of an aMZI element, it utilizes a Ring Resonator (RR) 501 as Spectral shaping element. The theoretical output spectral response of a RR in this configuration can be described using the following equation:

$$P_{out} = \left| \frac{t - a * e^{\frac{i(2\pi n_{eff})}{\lambda} * L}}{1 - t * a * e^{\frac{i(2\pi n_{eff})}{\lambda} * L}} \right|^2 \quad \text{Eq. 2}$$

Where λ is the operating wavelength, t is the transmission coefficient between the I/O waveguide and the ring, a is the attenuation constant inside the ring, L is the length of the ring and $n_{eff}$ is the effective refractive index of the optical mode inside the waveguide. The output power as a function of wavelength is plotted according to this equation in 502. An experimental output spectral response of such an optical device (including gratings, waveguides, tapered waveguides, and ring resonator), implemented on a polymeric PIC, is presented in 503.

As can be seen, in both the aMZI and the RR cases, the general shape of the theoretical spectral signature of the single element (aMZI/RR) and the experimental graph of the whole device (including the gratings/tapers/waveguides) are remarkably similar. This is due to the fact that the grating couplers, waveguides and tapered waveguides have a negligible spectral effect in this case.

Figure 6:
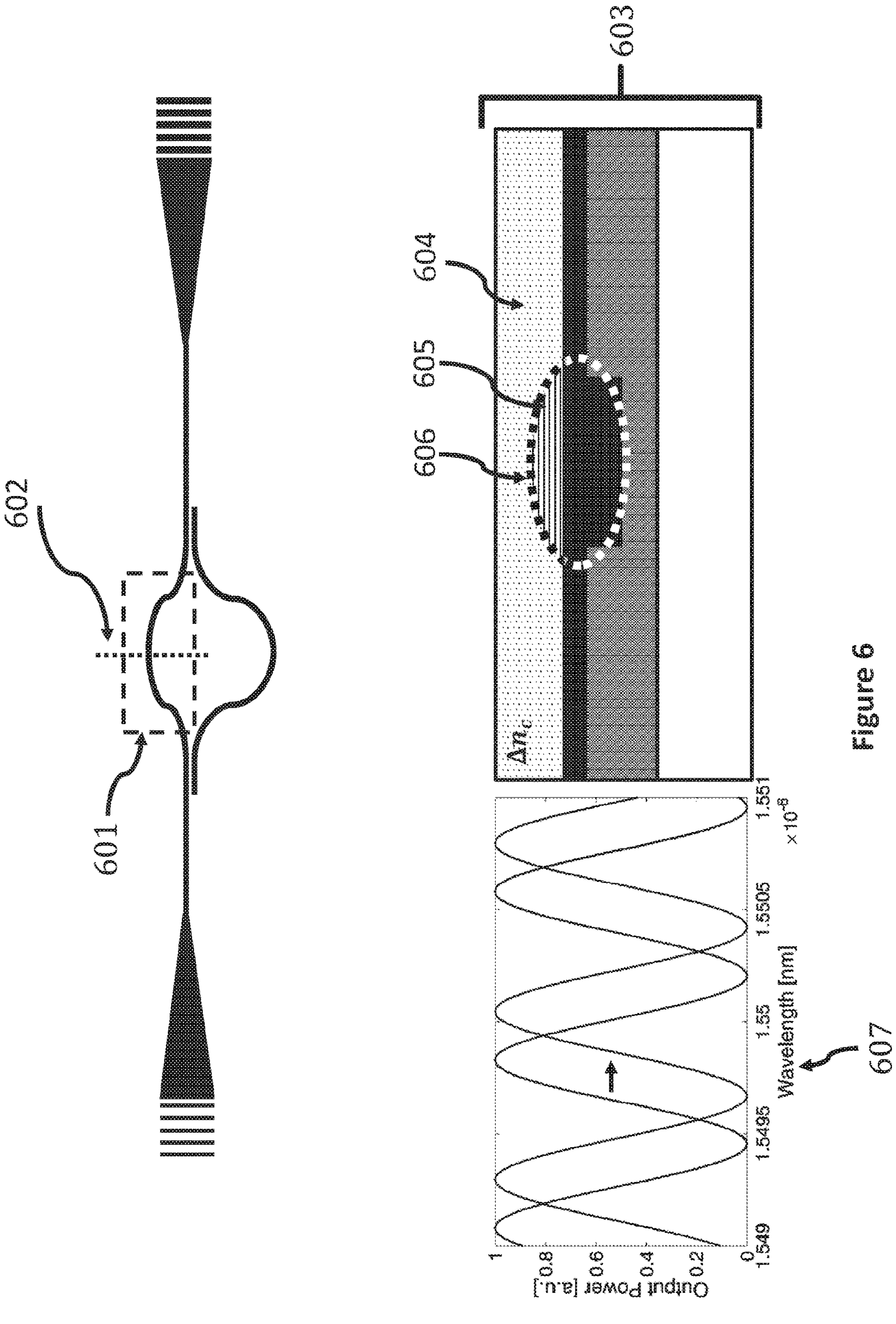
FIG. 6 presents usage of the presented devices as refractive index sensors.

Refractive Index Sensing:

FIG. 6 presents usage of the presented devices as refractive index sensors by inducing a change in the surrounding's refractive index at a specific region of the device (the 'sensing area') 601. In this case, the 'sensing area' contains one of the aMZI arms. 603 shows the cross section of the waveguide at the sensing area (cross section location is marked with 602). A change in the cladding's refractive index ($\Delta n_c$, dotted area, 604) at the 'sensing area' over one of the aMZI arms will induce a change in the effective refractive index of the optical mode ($\Delta n_{eff}$) in that specific area. This will result in a spectral change of the output spectral response (Spectral shift in this case), transforming Eq. 1 to the following:

$$P_{out} = \cos^2\left(\frac{2\pi}{\lambda} * (n_{eff} * \Delta L + L * \Delta n_{eff}) * \frac{1}{2}\right) \quad \text{Eq. 3}$$

In order to calculate the effect of the change in the surrounding's refractive index 604 (dotted section) on the effective refractive index (the refractive index of the optical mode inside the waveguide), a relatively complicated solution of Maxwell's equations needs to be obtained. In order to simplify the problem, we approximate the solution by introducing an overlap factor (OF) which ties the change of the effective refractive index to the change in refractive index of the surrounding ($\Delta n_c$) at the sensing area:

$$\Delta n_{eff} = \Delta n_c * OF \quad \text{Eq. 4}$$

This overlap factor is proportional to the ratio between the evanescent tail of the optical mode inside the cladding (marked with horizontal lines, 605) divided by the whole cross section of the optical mode (marked with a dashed circle, 606). The overlap factor gives a relatively accurate approximation in our case. Thus, Equation 3 can be rewritten to be:

$$P_{out} = \cos^2\left(\frac{2\pi}{\lambda} * (n_{eff} * \Delta L + L * \Delta n_c * OF) * \frac{1}{2}\right) \quad \text{Eq. 5}$$

Hence, a change in the surrounding's refractive index at the sensing area will change the effective refractive index of the optical mode in that area and will result in a change to the spectral signature manifested as a spectral shift depicted in 607.

In a similar manner, the equation for a RR sensing device should be modified to the following:

$$P_{out} = \left| \frac{t - a * e^{\frac{i(2\pi(n_{eff} + \Delta n_c * OF))}{\lambda} * L}}{1 - t * a * e^{\frac{i(2\pi(n_{eff} + \Delta n_c * OF))}{\lambda} * L}} \right|^2 \quad \text{Eq. 6}$$

In general, changes in the effective index of the optical mode ($\Delta n_{eff}$) can be achieved in two ways:

1. By changing the entire cladding material (Dotted area—604), (Bulk refractive index sensing).
2. By changing the refractive index at the surface of the device (Surface refractive index sensing). This approach is more relevant for our application and explained in detail below.

For bio-sensing applications, the 'sensing area' of the device is coated with capture agents capable of capturing a specific molecule of interest.

In particular, the spectral shaping element may be (directly or indirectly) coated with capture agents capable of capturing a specific molecule of interest.

Two or more optical devices may be treated with different capture agents capable of capturing different molecules.

In other words, the PIC may further comprise an additional spectral shaping element, wherein the additional spectral shaping element is coated with additional capture agents capable of capturing an additional specific molecule of interest, and wherein the capture agents and the additional capture agents are different capture agents and the specific molecule of interest and the additional specific molecule of interest are different molecules.

Figure 7:
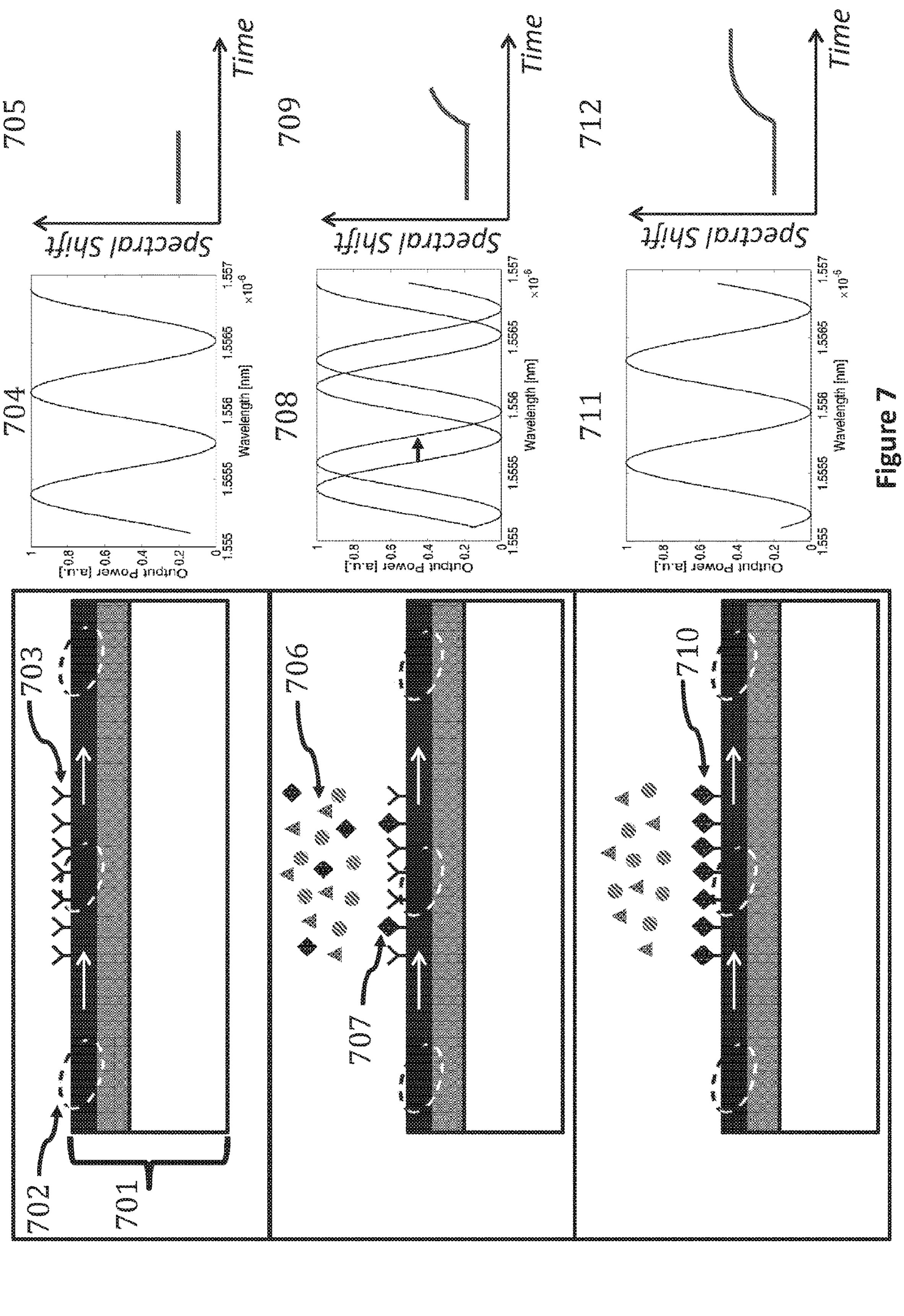
FIG. 7 demonstrates the concept of surface sensing.

FIG. 7 demonstrates the concept of surface refractive index sensing using a MZI. 701 shows a side view of the optical waveguide at the sensing area.

702 is the propagating optical mode (dashed ellipse). Most of the mode is confined inside the waveguide's core layer. However, its evanescent tail spreads outside the optical waveguide and encounters the specific capture probes 703 connected to the waveguide surface. The device's optical signature is being scanned 704 and monitored over time 705. The device is then being exposed to a sample 706 which might contain the molecule of interest. In case the molecule of interest is present in the sample, it will bind to the capture agents 707. This, in turn, will change (shift in this case) the spectral signature of the device 708 and indicate the presence of the molecule of interest in the sample 709. The rate of change of the spectral signature can indicate the concentration of the specific molecule. The change ends once binding occurs at all capture agents 710 and evident in the output function reaching its final location 711 as can be seen in the shift vs. time graph 712.

The molecule of interest can be, but is not limited to: proteins, enzymes, small molecules, peptides, nucleic acids (DNA or RNA), mammalian cells, microorganisms, and viruses.

The capture agents can be, but not limited to: antibodies or their fragments, aptamers/peptide nucleic acids and their chemical derivatives, somamers, enzymes, peptides, molecularly imprinted polymers, cells, and DNA.

Methods of Making Polymeric Chips

The disclosure also provides methods of manufacturing a polymer based photonic integrated circuits (PICs) comprising: providing a first polymeric layer having a refractive index of from 1.3 to 1.8 at a wavelength of 1300 nm; providing a second polymeric layer on the first polymeric layer, the second polymeric layer having a refractive index of from 1.4 to 1.9 at a wavelength of 1300 nm and an optical loss of at most 10 dB/cm at a wavelength of 1300 nm; and patterning an interface between the first polymeric layer and the second polymeric layer with a relief pattern to form a plurality of optical elements, wherein the difference between the refractive index of the first polymeric layer and the refractive index of the second polymeric layer is at least 0.1 at a wavelength of 1300 nm.

The disclosure also provides methods of manufacturing a polymer based photonic integrated circuit (PICs) comprising: providing a first polymeric layer; providing a second polymeric layer; and patterning an interface between the first polymeric layer and the second polymeric layer with a relief pattern to form a plurality of optical elements, wherein the plurality of optical elements comprise connected optical elements forming an optical device, and wherein the optical device comprises an I/O grating, a 2D waveguide, and a spectral shaping element.

The disclosure further provides methods of manufacturing a polymer based photonic integrated circuits (PICs) comprising: providing a first polymeric layer; patterning an interface of the first polymeric layer with a relief pattern to form a plurality of optical elements, wherein the plurality of optical element comprise connected optical elements forming an optical device, and wherein the plurality of optical elements comprises an I/O grating, a 2D waveguide, and a spectral shaping element.

The patterning an interface between the first polymeric layer and the second polymeric layer with a relief pattern to form at least one optical element may be achieved by providing the first polymeric layer by spin coating a layer of sol-gel on a substrate and imprinting the sol-gel using a mould and then curing the sol-gel.

The curing the sol-gel may be achieved by a UV curing process.

The providing a second polymeric layer on the first polymeric layer may be achieved by spin coating a solution of a polymer on the patterned first polymeric layer.

The so produced PICs may have any one of or all of the features of the PICs described herein.

As will be apparent such methods are advantageous since they provide the advantageous PICs described herein.

PIC Reader:

In the following section, we introduce an exemplary optical PIC reader 800 (FIG. 8) capable of mounting a PIC 807 and interfacing with various optical devices on its surface. The reader includes an optical arm 801 which contains a plurality of input and output (I/O) waveguides, which interface with the I/O grating couplers of optical devices on the surface of the PIC. The arm can be made to hover above the PIC by means of a motorized stage 808, attached to either the arm or the PIC. A laser module 802 provides the light source input for the input waveguide (interfaces with the input grating coupler of an optical device) and a detector unit 803 receives the output light from the output waveguide (interfaces with the output grating coupler of that optical device). A microcontroller unit 804 collects all the necessary signals for the various components of the reader 800 and controls the various components of the reader 800. The microcontroller 804 can be used to interface with the user or with other external devices (computer, mobile phone, tablet, etc.). It should be noted that the reader can interact with any type of PIC (Silicon, polymers, metallic, etc.) in the same manner explained above, provided the laser unit operates at the appropriate wavelength(s).

For some applications, a fluidics channel 805 can be mounted on top of the PIC and expose various optical devices (as shown in FIGS. 6 and 7) to fluid samples that can be fed from a pump 806. These fluids can include bodily fluids such as blood, urine, saliva, or other fluids such as water, milk and more.

Figure 8:
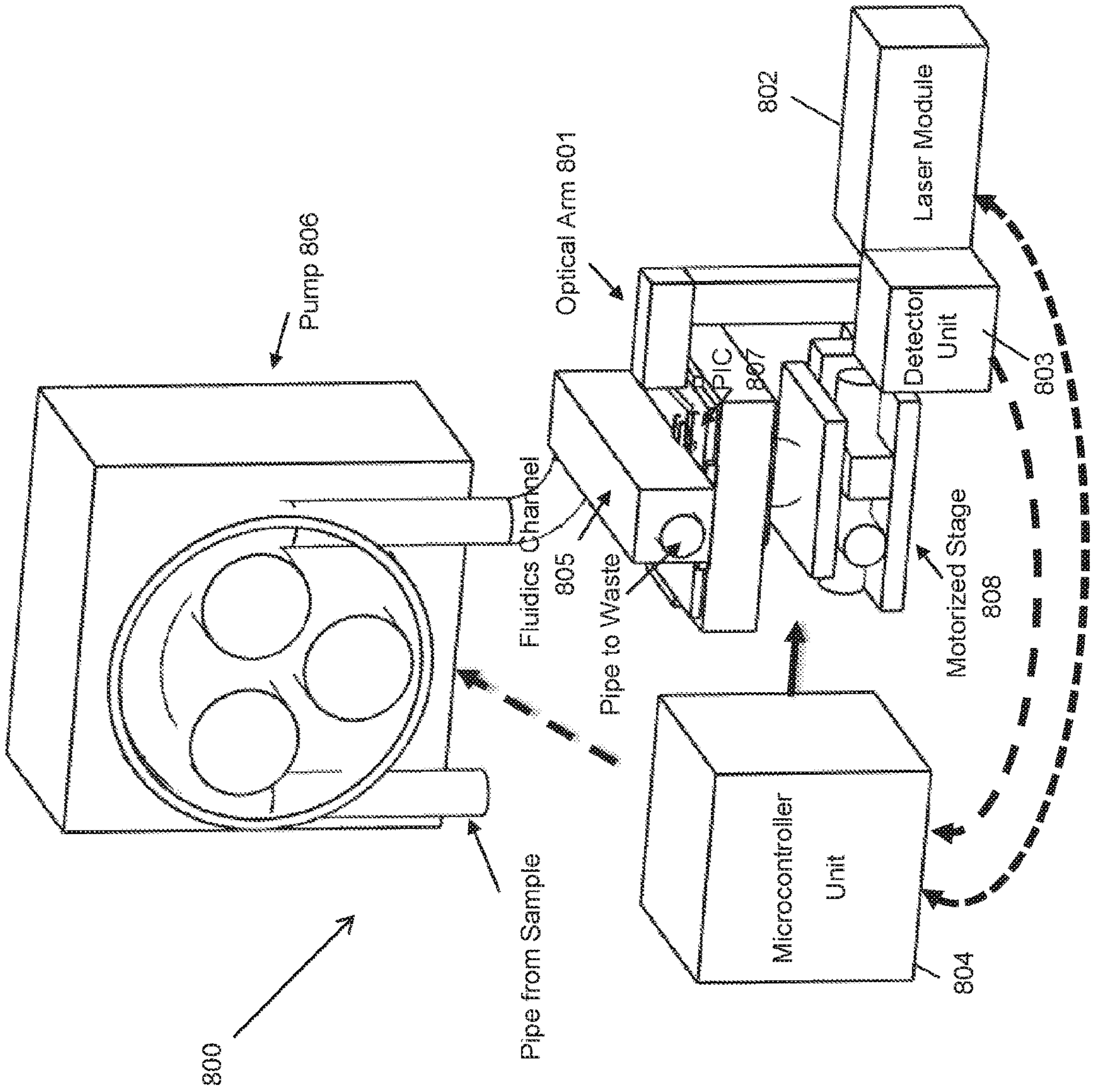
FIG. 8 presents an exemplary optical reader capable of mounting a PIC and interfacing with various devices on its surface.
Figure 9A:
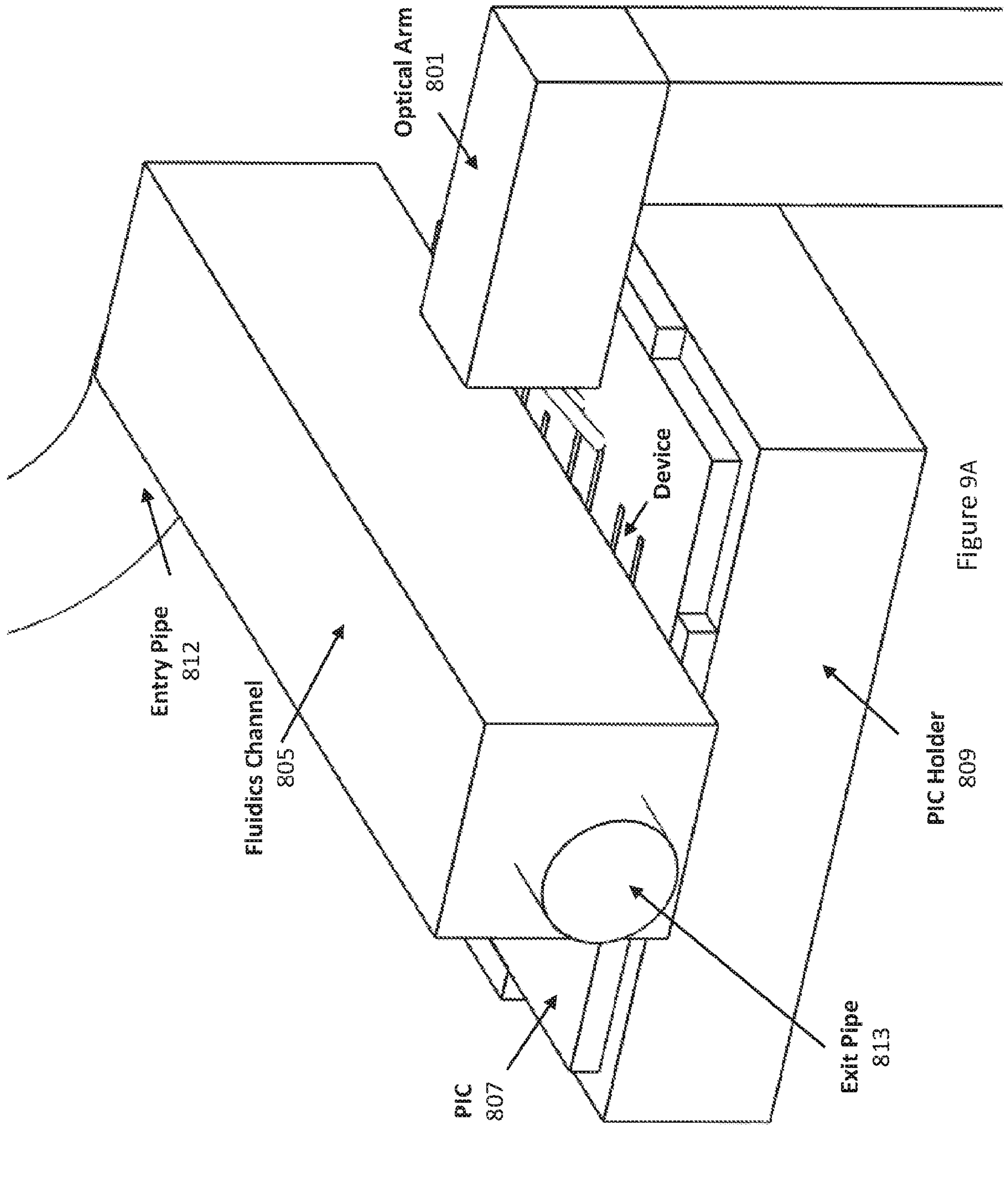
FIGS. 9A and 9B show more detailed representations of the main parts of the optical reader of FIG. 8.
Figure 9B:
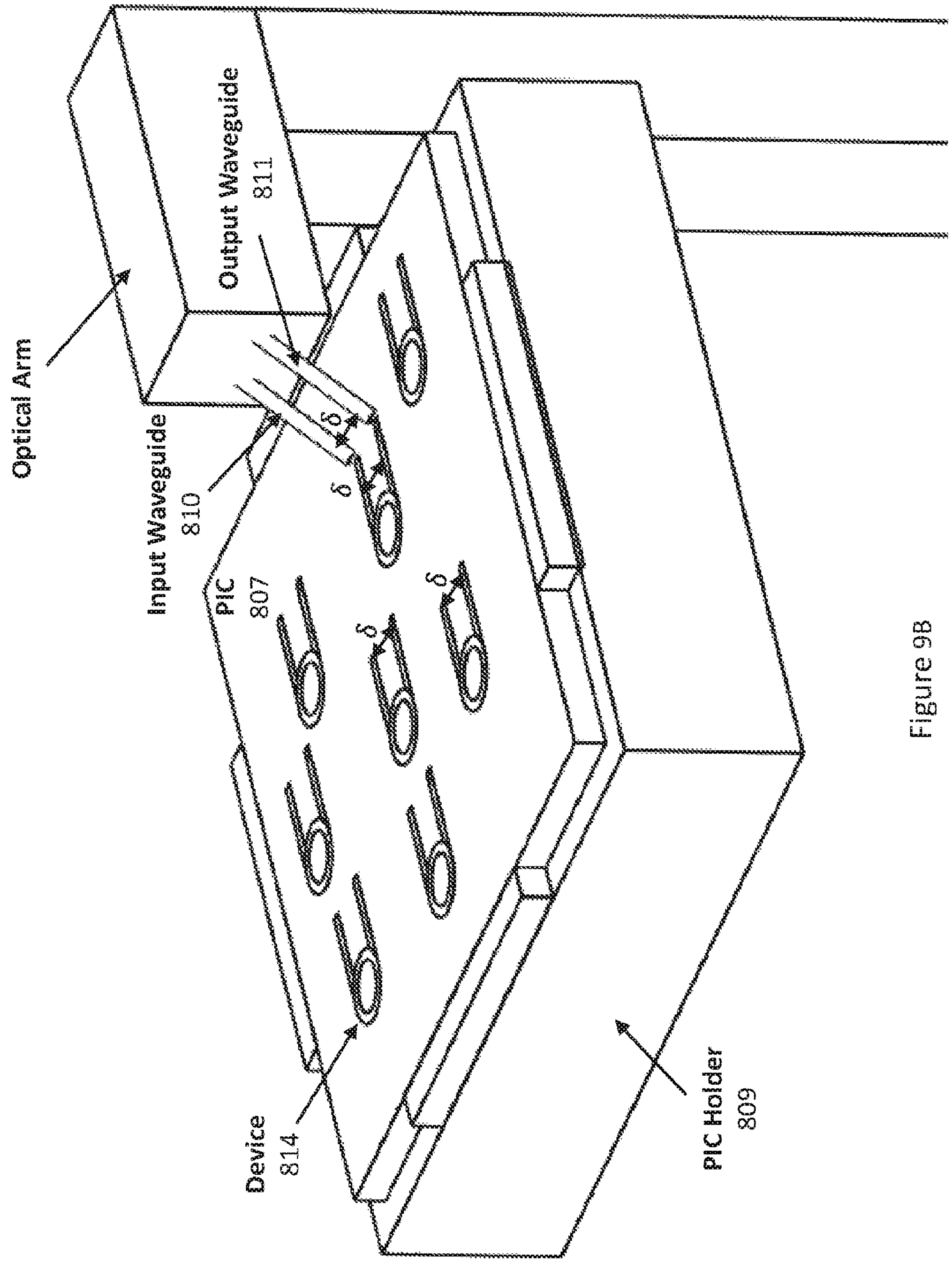

The Reader Components:

FIGS. 9A and 9B show more detailed representations of the main parts of the optical reader 800 of FIG. 8.

The optical reader comprises:

Optical Arm 801

The optical arm 801 contains the I/O optical waveguides 810-811. The waveguides are placed at a relative distance from each other that corresponds to the distance between the respective I/O grating couplers of the optical devices (not shown) on the PIC 807. The waveguides are mounted on the optical arm 801 at an angle which corresponds to the required angle of the grating couplers designed on the PIC. The optical arm 801 can either be stationary (with a moving PIC holder 809) or placed on top of a motorized stage 808 in order to allow it to hover over the PIC and reach the various optical devices located at different places on the surface of the PIC.

I/O Waveguides 810, 811

The I/O waveguides are structures by which light can be directed. This can be achieved using fused silica fibers, photonic crystal fibers, embedded integrated waveguides, etc. The waveguides can be designed, cleaved, or attached to lenses to provide a collimated spot.

PIC Holder 809

The PIC is mounted on a specially designed holder which keeps it securely in place. The holder can either be stationary or placed on top of a moving stage in order to allow the arm to hover over the PIC and reach the various optical devices on the PIC. The PIC holder 809 may be part of a cassette as described herein.

Motorized Stage 808

A motorized stage can control the movement of the optical arm or PIC holder in order to hop between the various optical devices on the PIC and accurately align the I/O waveguides of the optical arm with the I/O grating couplers of the optical devices.

A six-axes stage enables optimal light coupling to the PIC devices; however, depending on the required level of light coupling and the mechanical tolerances in the manufacturing process, a two-axes stage could also enable sufficient coupling to allow proper device functionality throughout the entire surface area of the PIC.

Laser Module 802

A laser module is driven by an electric power source and produces the laser light necessary to operate the optical devices on the PIC. The output of the laser module is fed to the input waveguide 810 on the optical arm. The laser module must enable the detection of the induced change in the spectral signature of the optical devices, either by producing a sufficiently wide bandwidth of light (a simple light source which requires an elaborate detection scheme) or by producing a narrow bandwidth of light that can be swept across the required band of wavelengths (an elaborate light source which requires a simple detection scheme).

The latter can be achieved with common low-cost laser modules where the peak wavelength of the output light is temperature dependent and can be controlled using an embedded thermoelectric cooler (TEC). The TEC requires a separate electrical power driver which can be controlled by the microcontroller. A thermistor is mounted on the laser module and responds to the change in temperature. The thermistor is connected to a voltage divider circuit and its output is read by an analogue input of the microcontroller. This temperature reading corresponds to the peak wavelength of the laser in real time. Alternatively, the laser module or its output could be controlled by other means (mechanical, optical and other) to produce a scanning peak of laser light.

Optical Detector 803

An optical detector detects the light output from the relevant PIC optical device and produces a corresponding electrical signal. The detector is fed with light from the output waveguide 811 on the optical arm and produces a corresponding electrical signal that can be read by an analogue input of the microcontroller 804. An electrical circuit maintains the required electrical bias of the photodetector and amplifies the electrical signal to fit the valid range of the analogue inputs of the microcontroller.

In case a wideband light source is used, the optical detector 803 must be part of a spectral detection scheme, which can spectrally separate the output to a degree that enables an adequate detection of the induced change in the spectral signature of the optical device. This can be achieved by placing a tuneable narrowband filter (e.g., tuneable monochromators, Faby-Perot resonators, Fiber Bragg Gratings, etc) before the optical detector and sweeping the filter through the required range of wavelengths.

Fluidics Channel 805

The Fluidics Channel 805 comprises a mechanical adapter mounted on top of the PIC, with a gasket in between (not shown), and connects to fluid carrying pipes 812, 813 (FIG. 9A). The adapter and gasket form a sealed channel which exposes an area on the surface of PIC 807 to a flow of liquid sample.

Pump 806

An electromechanically controlled pump (syringe, peristaltic, etc.) feeds the entry pipe 812 with a liquid sample. The sample is made to flow over the PIC surface using the fluidics channel 805 and the flow rate is controlled by the microcontroller 804.

Microcontroller 804

The microcontroller is a real time embedded controller responsible for controlling the various components of the reader and providing the link to an external interface (not shown), either in the form of a connected application (PC, mobile, etc.) or in the form on an integrated user interface.

The Optical I/O Interface:

The various optical devices 814 on the PIC 807 are designed such that their input and output grating couplers are located at a fixed distance (δ in FIG. 9B) which corresponds to the distance between the I/O waveguides 810, 811 on the optical arm. By moving the stage (or the arm), an adequate alignment can be achieved between the PIC and the arm, so that sufficient amount of light can be coupled in and out of each of the available optical devices on the PIC. In particular, because the I/O optical waveguides are located at a distance which corresponds to a distance between the I/O optical ports of the optical device(s) of the PIC, input and output coupling may be achieved relatively easily and simultaneously.

Optical Device Location and Stage Alignment:

The reader can locate the various devices on the surface of the PIC by scanning the optical arm across its entire surface while keeping the laser turned on and monitoring the reflected signal. The appearance of a reflected signal during the scanning process indicates the presence of a device at a given coordinate. The reader is completely flexible with respect to the layout of the PIC; however, the scanning process necessary to cover the entire surface area of the PIC can be time consuming.

Figure 10:
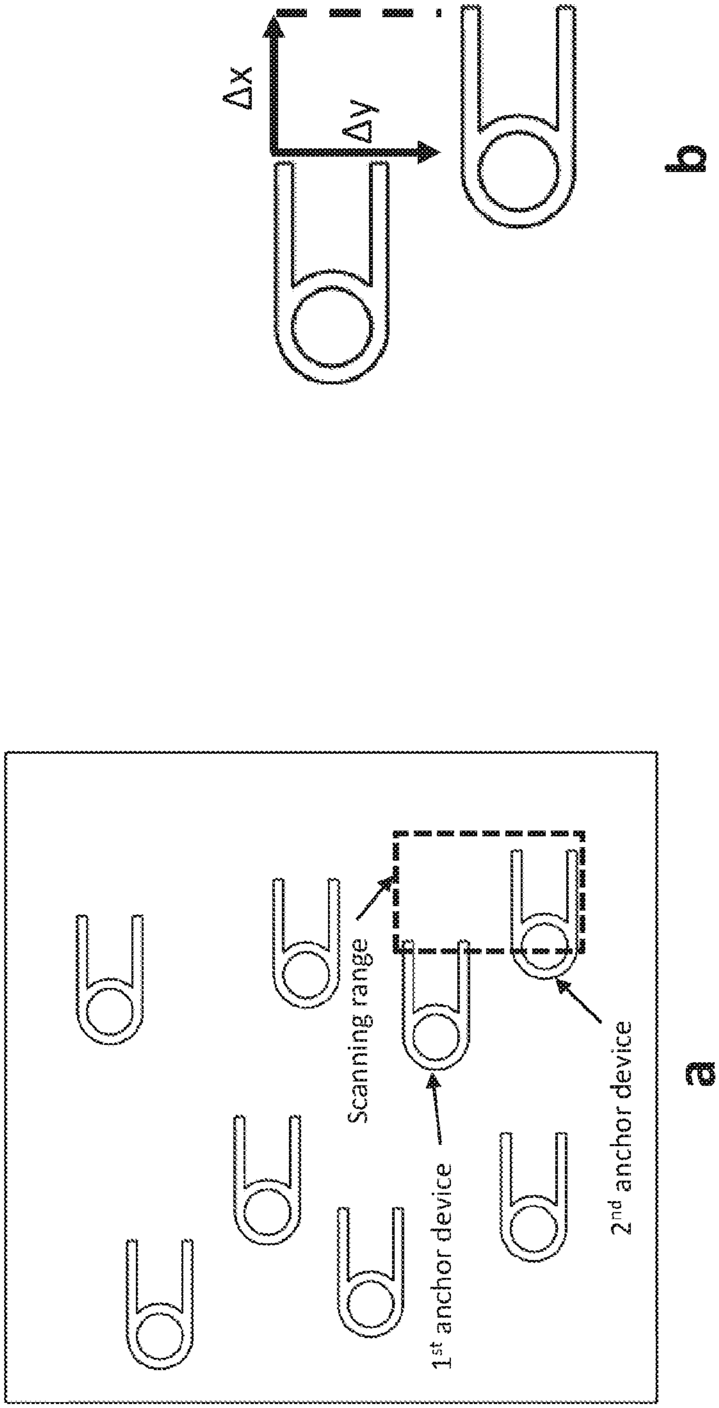
FIG. 10 (*a, b*) show an exemplary arrangement of anchor devices on a PIC.

By using prior knowledge of the chip layout, it is possible to skip an entire surface scan and replace it with a quick scan, aimed at locating a specific optical device, referred to as an anchor device, which serves as an origin for the location of other optical devices on the PIC. This scan is limited to a small area of the PIC (FIG. 10*a*) that is determined by the manufacturing tolerances of the PIC and reader and by the engineering parameters of the mechanical stage. Once the anchor device is found, its location serves as the origin in relation to which all other devices are known to be located. A single anchor device is useful for applications where two-axes stage adjustments are sufficient to provide adequate coupling. In other applications, a second adjacent anchor device can be used in order to extract the necessary alignment information to adjust the stage along all required axes.

The anchor devices could either be fully functional devices or specific "target" devices created to provide alignment points; such specific devices can have a significantly smaller surface area than other devices on the chip, which does not sacrifice much of the functionality of the chip. An example anchor device may simply include an input grating, a 2D waveguide, and an output grating, such that light is coupled from the input grating to the output grating.

PIC Identification Algorithm:

The location of each optical device is a design parameter and the relative location of two or more devices can be used to identify the specific PIC layout. This information can be acquired using a specific scan or incorporated into another scanning routine, like the initial scan used to locate anchor devices. In the example of two anchor devices, this information includes the relative location of the anchor devices with respect to one another (ΔX and ΔY in FIG. 10*b*) and micron level changes to ΔX and ΔY can be detected and provide a unique identifier for many different PIC layouts without sacrificing the functionality of the chip.

Simultaneous Detection of Several Analytes:

Multiple devices on the PIC can be treated with different capture agents to react to different specific analytes inside a sample. While the sample is made to flow on top of the optical devices, the reader can move the arm/PIC and hop between the various devices in order to repeatedly monitor their spectral signature and measure the reaction to each specific analyte. In this way, it is possible to determine the rate of change of spectral signature for multiple optical devices and, consequently, the concentration of multiple molecules of interest within a fluid using a single motorized arm. This can result in a considerable reduction in complexity vs systems that e.g. have multiple I/O waveguide pairs or multiple PICs or taking multiple measurements.

Implementation of Methods

There is also provided a computer readable medium having instructions stored thereon which, when executed by a processor, cause the performance of a method described herein.

There is also provided a computer program including instructions which, when executed by a processor, cause the performance of a method described herein.

There is also provided a system including at least one processor and a computer readable medium, wherein the computer readable medium has instructions stored thereon which, when executed by the at least one processor, cause the system to perform a method described herein.

The computer readable media may be configured to store instructions for execution by the processor. The processor(s) may include a number of sub-processors which may be configured to work together, e.g. in parallel with each other, to execute the instructions. The sub-processors may be geographically and/or physically separate from each other and may be communicatively coupled to enable coordinated execution of the instructions.

The computer readable media may be any desired type or combination of volatile and/or non-volatile memory such as, for example, static random access memory (SRAM), dynamic random access memory (DRAM), flash memory, read-only memory (ROM), and/or a mass storage device (including, for example, an optical or magnetic storage device).

The system including the processor and computer readable medium, may be provided in the form of a server, a desktop computer, a laptop computer, an embedded SoC, a PCB or the like.

EXPERIMENTAL SECTION

As described in the previous sections, the platform can detect bulk refractive index change as well as capture of specific molecules. In the following, we demonstrate both schemes. For the detection of bulk refractive index, we use the platform depicted in 302 (FIG. 3). A quartz slide acts as a substrate with a refractive index of ~1.44 for a wavelength of 1.55 μm. On top of it, we use a UV curable resin (e.g. 'OrmoclearFX' by microresist technology), which is patterned with a premade flexible PDMS mould to generate the optical devices. This film has a thickness of 0.2-1.5 microns and a refractive index of ~1.539 for a wavelength of 1.55 μm.

In order to perform bulk refractive index sensing test, we used water with different concentrations of glucose to achieve solutions with a range of refractive indices. The empirical equation relating glucose concentration to refractive index change is:

$$\Delta n_c = 0.14713 \times \text{Concentration}$$

For this experiment, we used optical devices comprising both aMZIs and RRs. The selected parameters for the optical devices are summarized in the next table:

TABLE 1

| RR | | Short aMZI | | Long aMZI | |
|---|---|---|---|---|---|
| $n_{eff}$ | 1.49 | $n_{eff}$ | 1.49 | $n_{eff}$ | 1.49 |
| OF | 0.03 | OF | 0.03 | OF | 0.03 |
| L | 1.5 mm | L | 3.26 mm | L | 13.15 mm |
| a = t | 0.9 | ΔL | 2.15 mm | ΔL | 2.15 mm |

Next, we substitute the data in table 1 into equations 5-6 to assess the expected spectral shift for each device when exposed to different refractive indexes; the results are summarized in table 2:

TABLE 2

| Theory | | | | |
|---|---|---|---|---|
| Glucose % | $\Delta n_c$ | RR Δλ [pm] | Short aMZI Δλ [pm] | Long aMZI Δλ [pm] |
| 0.5 | $0.7 * 10^{-3}$ | 21.9 | 33.1 | 133.6 |
| 1 | $1.4 * 10^{-3}$ | 43.8 | 66.2 | 267.2 |
| 2 | $2.8 * 10^{-3}$ | 87.7 | 132.5 | 534 |
| 4 | $5.6 * 10^{-3}$ | 175 | 265 | — |

Figure 11:
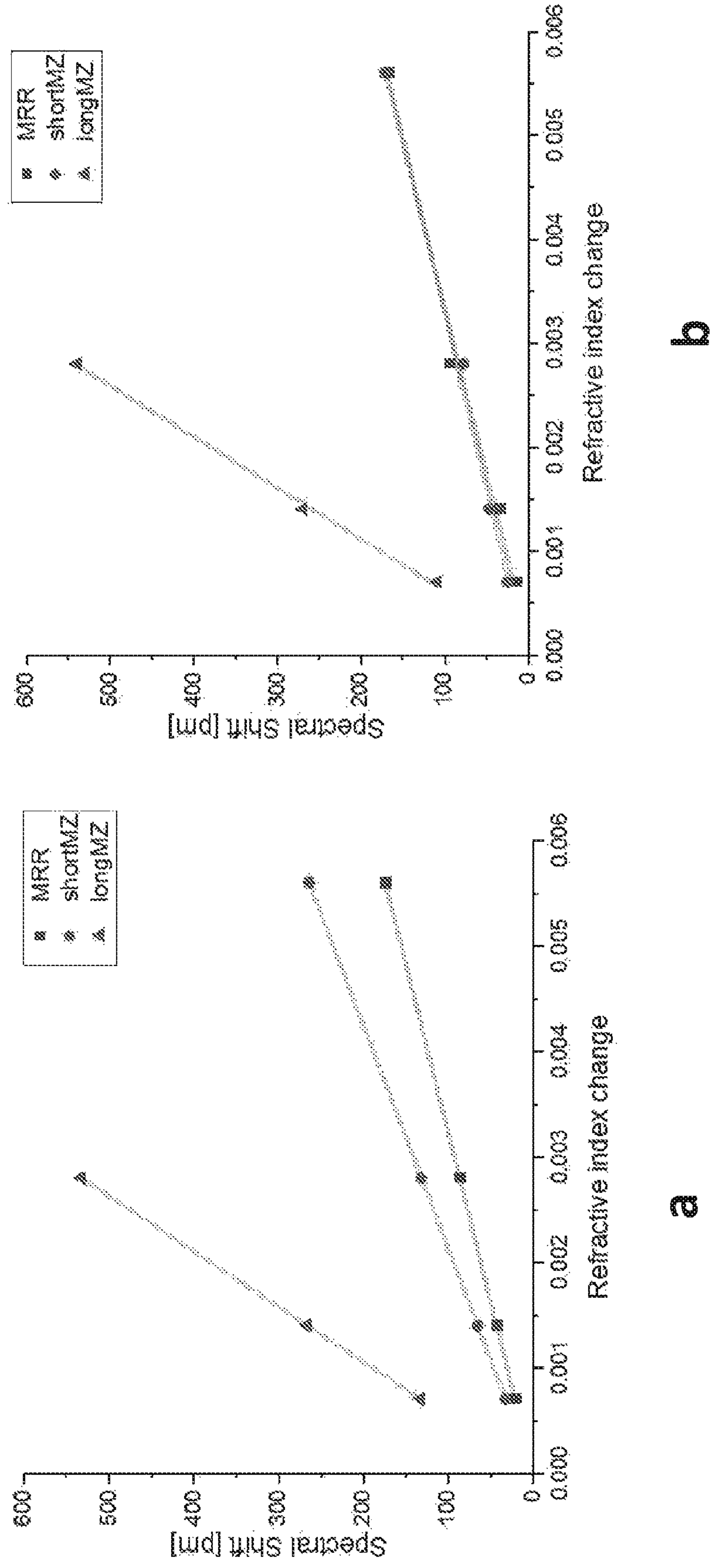
FIG. 11 presents the experimental results of a bulk refractive index sensing test with a RR as a sensing device.

FIG. 11 compares the experimental results (11.*b*) with the theoretical results (11.*a*). Each subfigure shows the relative shift of the three devices when exposed to various refractive indexes. The experimental results are also presented in table 3.

TABLE 3

| Experiment | | | | |
|---|---|---|---|---|
| Glucose % | $\Delta n_c$ | RR Δλ [pm] | Short aMZI Δλ [pm] | Long aMZI Δλ [pm] |
| 0.5 | $0.7 * 10^{-3}$ | 16 | 26 | 110 |
| 1 | $1.4 * 10^{-3}$ | 35 | 48 | 270 |
| 2 | $2.8 * 10^{-3}$ | 95 | 78 | 540 |
| 4 | $5.6 * 10^{-3}$ | 168 | 172 | |

As can be seen, there is good correlation between the theoretical and experimental results and the responsivity of the devices (shift as a function of refractive index change) shows a linear slope. The slight deviation between experiment and theory is likely due to an inaccurate measurement of the optical device's exact length and the aforementioned simplification used to derive the OF.

In order to demonstrate the detection of specific molecules (Surface sensing) we use the platform mentioned in 301. A thin glass slide acts as a substrate. On top of it, we use a UV curable resin (e.g. 'Ormostamp' by microresist technology), which is patterned with a premade mould. This film has a thickness of a few tens of microns and a refractive index of ~1.49 for a wavelength of 1.55 μm. On top of this layer, we spin coat a Polyimide layer (e.g. VTEC-1388 by 'RBI'). The polyimide layer may be spin coated from a 1:1 mixture of polyimide and NMP as solvent. For example at a speed of 2000 rpm for 60 seconds. The thickness of the Polyimide layer is between 200 nm-900 nm and its refractive index is ~1.65 for a wavelength of 1.55 μm. The polyimide layer is thermally cured.

Figure 12:
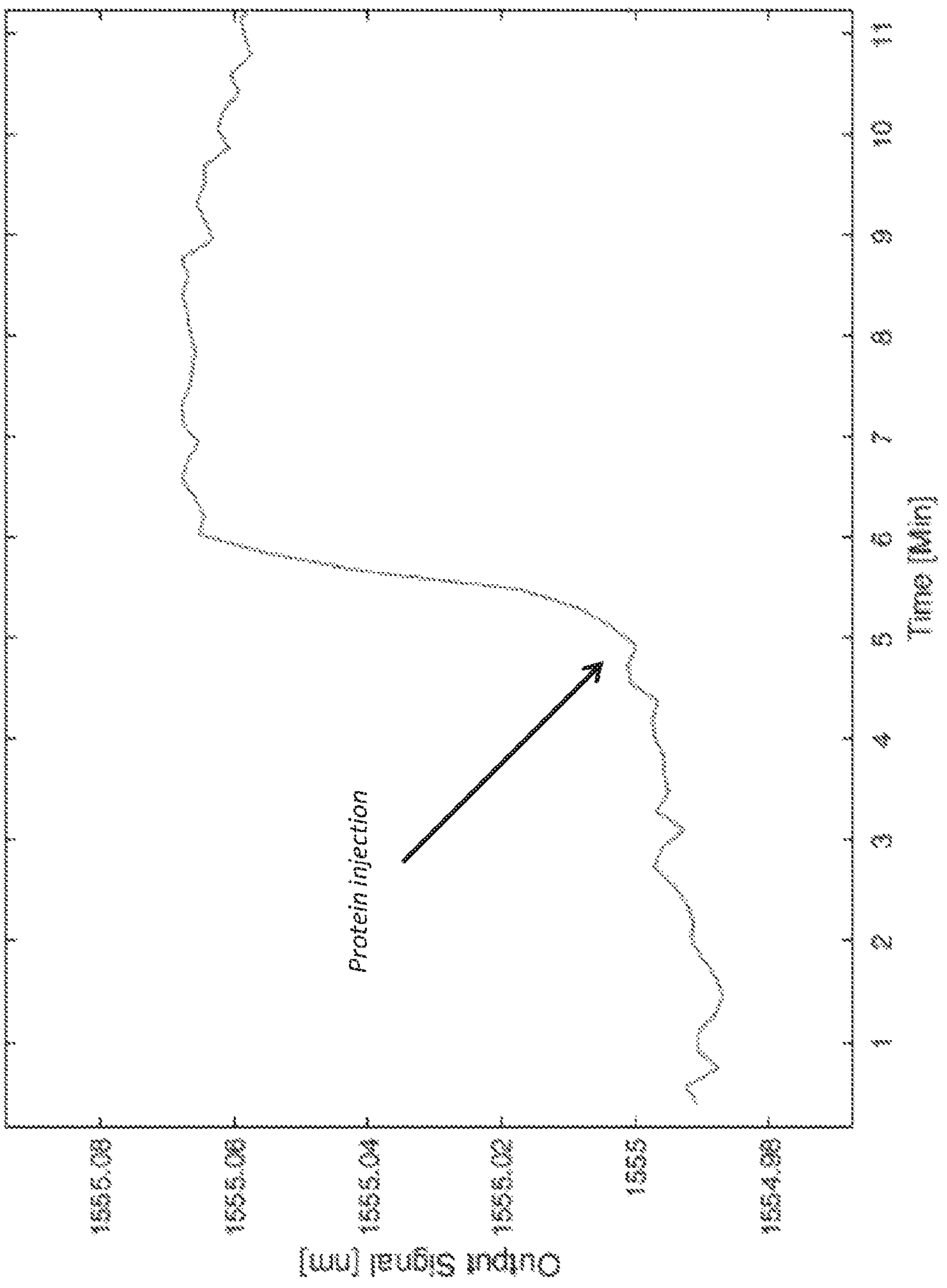
FIG. 12 shows the location of the ring resonator peak as a function of time in a test for the detection of a specific molecule.

With reference to FIG. 12, the molecule we detect in this experiment is 'Streptavidin' due to its high affinity to another molecule, 'Biotin'. These molecules covalently bond to form a strong duplex and are a gold standard for validating sensing platforms. For this experiment, we used a RR based device on a PIC whose parameters were detailed in the previous paragraph. The RR was coated with a monolayer of Biotin-PEG-Silane molecule in order to specifically bind to Streptavidin.

FIG. 12 shows the location of the ring resonator peak as a function of time. At the beginning of the measurement, the output is stable while distilled water is made to flow over the device's surface. At the marked point, a highly diluted protein solution of Streptavidin in water $$\sim 25\frac{\mu g}{ml}$$

is injected resulting in a dramatic shift of the location of the detected Lorentzian peak which indicates the presence of the molecule in the solution.

Figure 12B:
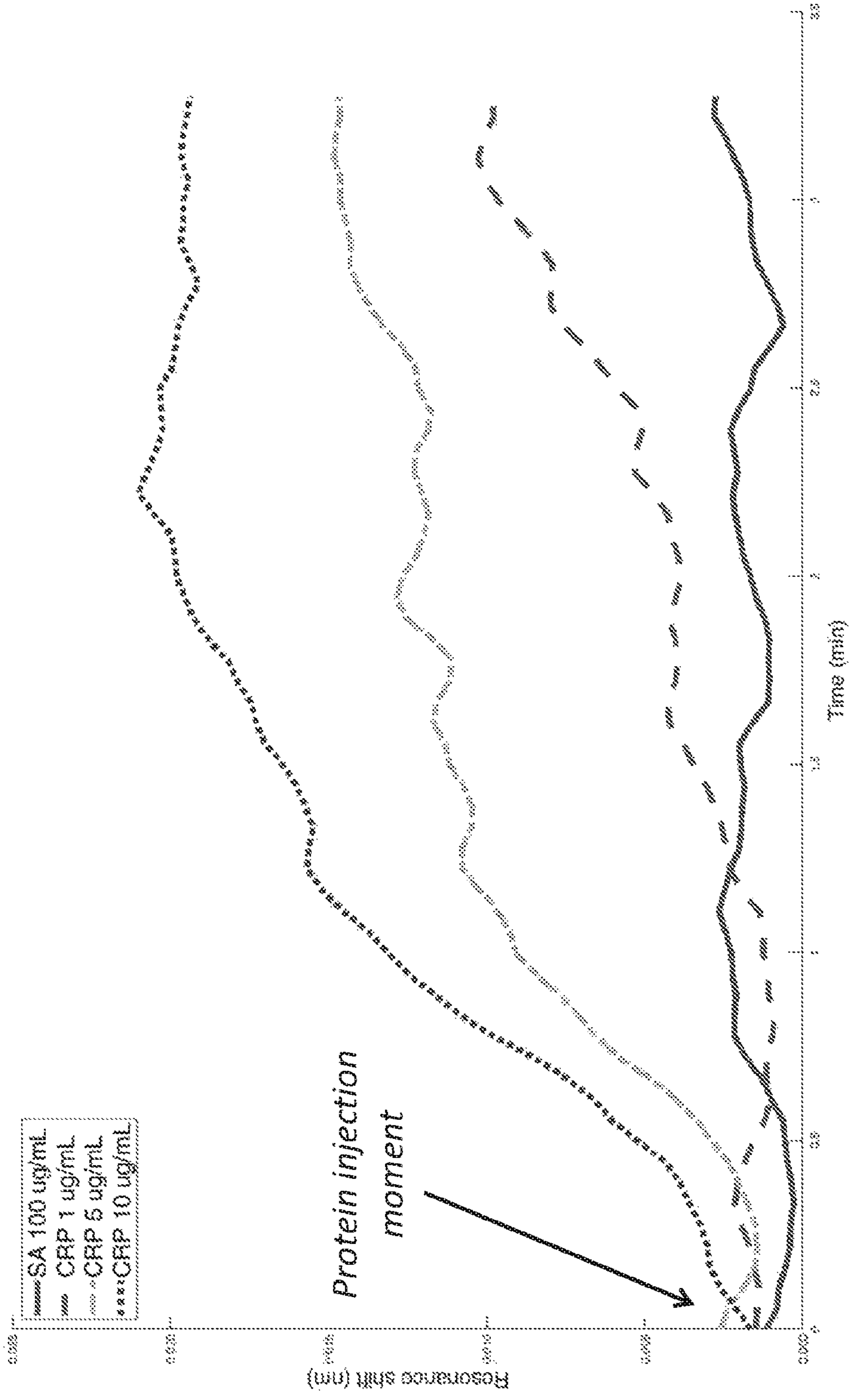
FIG. 12B shows the location of a ring resonator peaks as a function of time in tests for the detection of specific molecules.

With reference to FIG. 12B, the molecule we detect in this experiment is called C-reactive protein (CRP) which is an inflammatory biomarker. For this experiment, we used a RR based device on a PIC whose parameters are detailed above. The RR was coated with anti-CRP capture agents in order to specifically bind to CRP.

FIG. 12B shows the location of the ring resonator peak as a function of time for samples containing different concentrations of CRP. At the beginning of the measurement, the output is stable while phosphate buffered saline (PBS) is made to flow over the device's surface. At the marked point, highly diluted protein solutions of CRP in PBS are injected resulting in a dramatic shift of the location of the detected Lorentzian peak which indicates the presence of the molecule in the solution. In addition, the sensor is exposed to a solution of another protein, streptavidin, which generates no shift in resonance. This is done to demonstrate the specificity of the sensors.

Cassette:

As shown in FIGS. 13 to 16, there is also provided a cassette 900 comprising: a mounting 920 for removably mounting the cassette 900 to a reader; a photonic integrated circuit (PIC) 907 comprising an input grating, a 2D waveguide, a spectral shaping element, and an output grating. The spectral shaping element may be coated with capture agents capable of capturing a specific molecule of interest. When the cassette 900 is mounted in the reader, the input grating is operably connectable with an input waveguide of the reader and the output grating is operably connectable with an output waveguide of the reader. The cassette comprises a fluid inlet 912. The fluid inlet 912 is fluidly connected to the PIC 907. In this way the fluid inlet 912 may also be fluidly connected to the capture agents and/or spectral shaping element. The cassette comprises at least one pump component. When the cassette 900 is mounted in the reader, the pump component and the reader form a pump 906 for pumping fluid from the fluid inlet 912 to the PIC 907.

Figure 14:
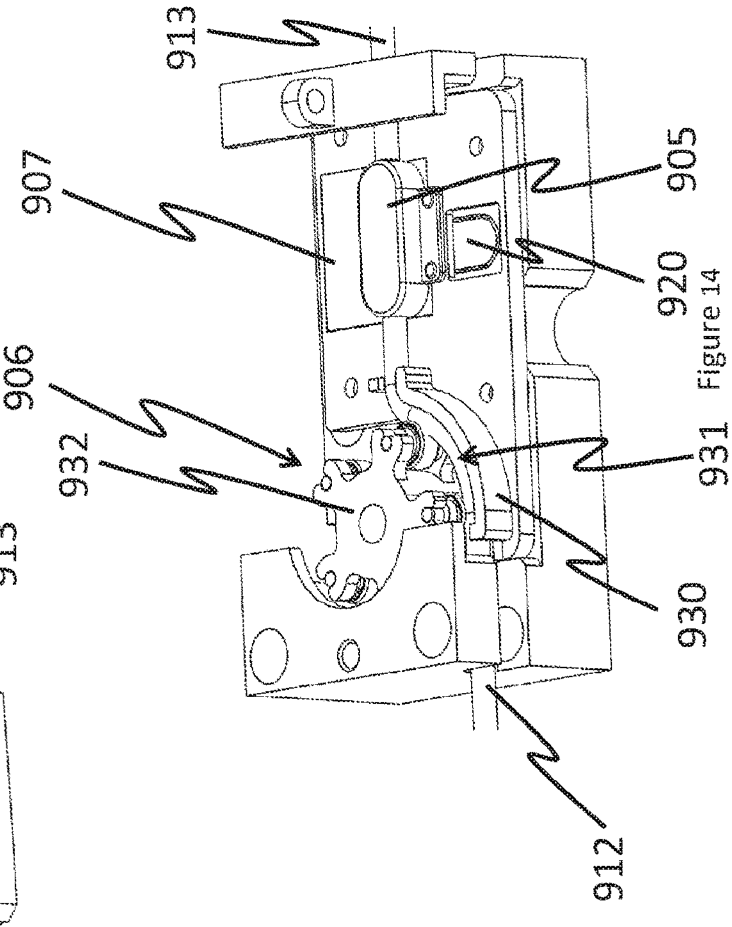
FIG. 14 shows a cutaway perspective view of a cassette according to the example of FIG. 13, connected to a rotor of a photonic integrated circuit (PIC) reading device according to an example.
Figure 13:
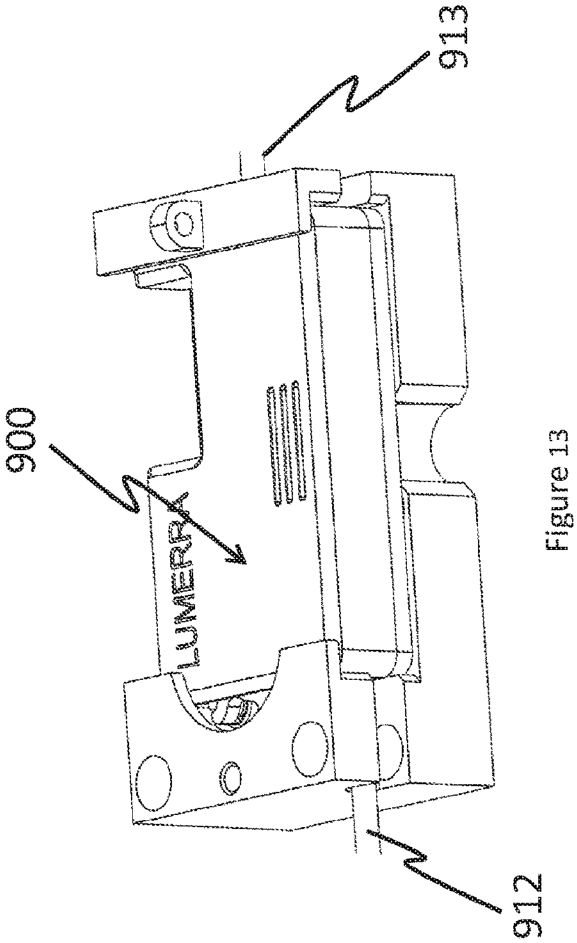
FIG. 13 shows a perspective view of a cassette according to an example connected to a rotor of a photonic integrated circuit (PIC) reading device according to an example.
Figure 16:
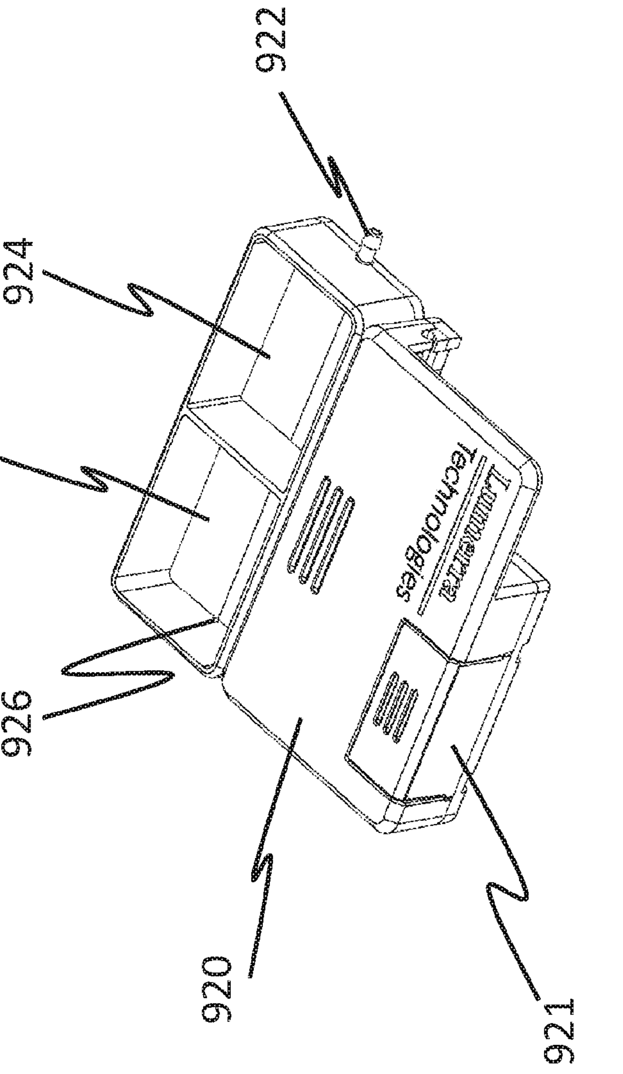
FIG. 16 shows a perspective view of a cassette according to the embodiment of FIG. 13, further including an input reservoir, a waste reservoir, and a dust cover.
Figure 15:
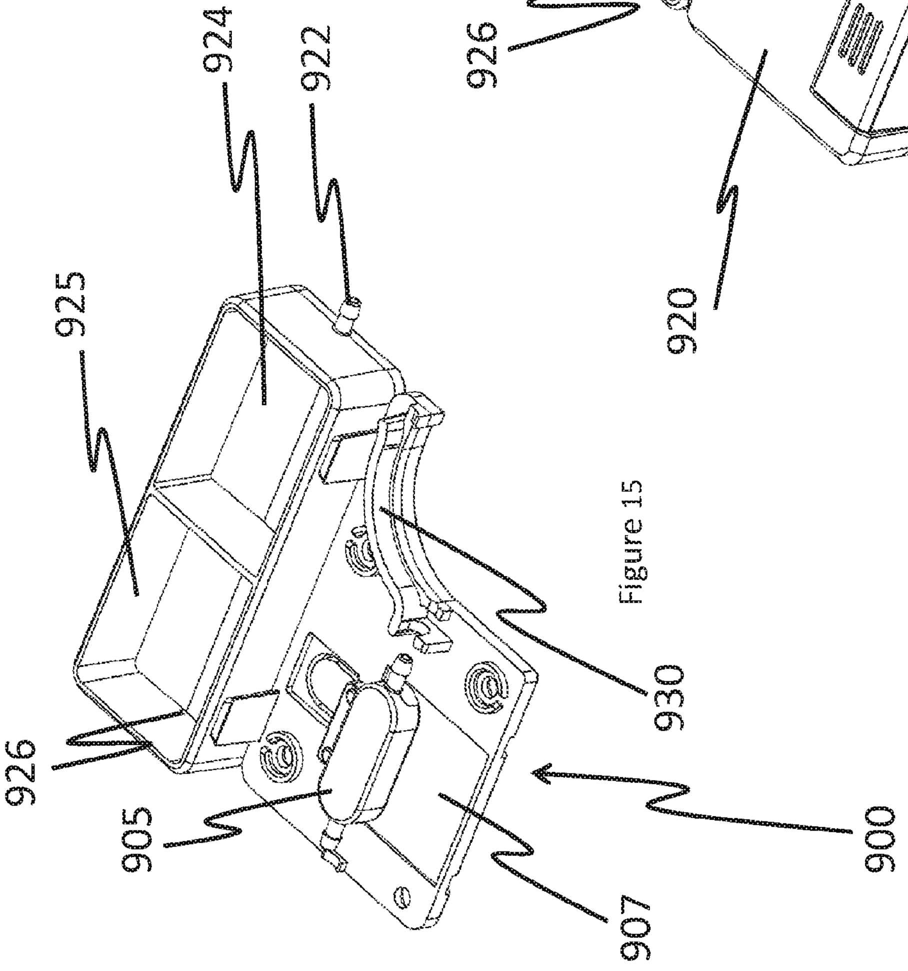
FIG. 15 shows a cutaway perspective view of a cassette according to the example of FIG. 13, further including an input reservoir and a waste reservoir.

As shown in FIGS. 13 and 14, the fluid inlet 912 may be located at an end of a flexible tube 931, described further below. Additionally or alternatively, as shown in FIGS. 15 and 16, the fluid inlet 912 may be connected to input reservoir 924, as described further below.

Cassettes 900 as described above may be advantageous. In particular, the cassette 900 may contain all of the parts requiring replacement between the analysis of different samples, such that analysis of multiple samples may be more easily achieved and/or the time between analysis of samples potentially containing specific molecules of interest may be reduced. For example, fixed devices containing all features as described above (e.g. the cassette 900 and the reader as a single device) may present difficulty in changing, for example, the PIC 907, or samples/fluids (e.g. potentially containing specific molecules of interest), and/or it may take significant time to analyse multiples samples/fluids potentially containing specific molecules of interest. On the contrary, cassettes 900 as described above may be easily switched out between analysis runs. Cassettes 900 as described above may also be self-contained. Accordingly, cassettes 900 as described above may reduce overall analysis time to analyse multiple fluids (e.g., multiple samples/fluids potentially containing specific molecule(s) of interest).

As shown in FIG. 14, the at least one pump component may comprise a flexible tube 931 fluidly connecting the fluid inlet 912 and the PIC 907. In particular, the flexible tube 931 may be compressible such that the tube may be used with a peristaltic pump, for example, as described below.

The at least one pump component may comprise a guide member 930. Cassettes 900 including the flexible tube 931 may allow for positioning of the flexible tube 931 against the guide member, as described below.

As shown in FIG. 14, when the cassette 900 is mounted in the reader the flexible tube 931 may be compressible between the guide member 930 and a rotor 932 of the reader to form a peristaltic pump. Advantageously, in this way the more costly parts of the pump may be reusable, whereas the cheaper components of the pump may be single use. In particular, the components of the pump which come into contact with the sample (including the flexible tube 931 and/or the PIC 907) are automatically replaced when the cassette 900 is replaced.

The PIC 907 may be any PIC as described herein. Cassettes 900 including the PIC 907 as described herein may have any of, any combination of, or all of, the associated features or advantages of the PICs as described herein.

The cassette 900 may further comprise a fluid outlet 913 fluidly connected to the PIC 907.

As shown in FIGS. 13 and 14, the fluid outlet 913 may be located at the end of a flexible tube. Alternatively, as shown in FIGS. 14 and 15, the fluid outlet 913 may be connected to a waste reservoir 925 as described below.

As shown in FIGS. 15 and 16, the cassette 900 may further comprise an input reservoir 924. The input reservoir 924 may be fluidly connected to the fluid inlet 912. The flexible tube may fluidly connect the fluid inlet 912 and the input reservoir 924. The input reservoir 924 may comprise an input reservoir outlet 922, e.g. such that fluid in the input reservoir 924 may flow through the input reservoir outlet 922 and then the fluid inlet 912. In other words, the input reservoir outlet 922 may be fluidly connected to the fluid inlet 912. In this way fluid (e.g. a sample potentially containing a specific molecule of interest) may be easily fed to the fluid inlet 912.

As shown in FIGS. 15 and 16, the cassette 900 may further comprise a waste reservoir 925. The waste reservoir 925 may be fluidly connected to the fluid outlet 913. The waste reservoir 925 may comprise a waste reservoir inlet 926, e.g. such that fluid flowing from the PIC 907 (e.g. after flowing over capture agents) may flow through the fluid outlet 913 and then through the waste reservoir fluid inlet 926. In other words, the waste reservoir inlet 926 may be fluidly connected to the fluid outlet 913. In this way the cassette 900 may not need to be connected to an external outlet e.g. a waste line. Further, cassettes 900 comprising an input reservoir 924 and/or a waste reservoir 925 as described above may result in a self-contained cassette 900; a sample to be analysed may be contained in the input reservoir 924 and, in use, the sample (e.g. a fluid potentially containing a specific molecule(s) of interest) may flow from the input reservoir 924, over the PIC 907, through the fluid outlet 913, and into the waste reservoir 925. Accordingly, the cassette 900 may need not be connected to any external fluid flow lines and may be self-contained.

The input grating and/or the output grating of the PIC 907 may be coverable with a removable dust cover 921. The dust cover 921 may protect the input grating and/or the output grating from dust and/or other contamination e.g. fluid spillage.

The cassette 900 may include a fluidics channel 905 for flowing a sample (e.g. potentially containing a specific molecule of interest) over the PIC 907. As described above, for some applications, the fluidics channel 905 can be mounted on top of the PIC 907 (as shown in FIGS. 14 and 15) and expose various optical devices, such that fluid samples that can be fed from a pump 806. These fluids can include bodily fluids such as blood, urine, saliva, or other fluids such as water, milk and more.

As shown in FIG. 14, in particular, the cassette 900 may comprise a mounting 920 for mounting the cassette 900 to a reader. The mounting 920 may have any features which enable the cassette 900 to be held by a reader in an in use position. As shown in FIG. 14, the mounting may comprise a detent for holding the cassette 900 in an in use position.

There is also provided a photonic integrated circuit (PIC) reading device comprising: a mounting for removably receiving a cassette 900 including a PIC 907, an input waveguide; and an output waveguide. When the cassette 900 is mounted in the reader: the input waveguide is operably connectable with an input grating of the PIC 907 and the output waveguide is operably connectable with an output grating of the PIC 907. The PIC reading device comprises at least one pump component. When the cassette 900 is mounted in the reader, the pump component and the cassette 900 form a pump for pumping fluid from a fluid inlet 912 of the cassette 900 to the PIC 907 of the cassette 900.

PIC reading devices as described above may provide advantages. In particular, the PIC reading device may be used with the cassette as described above and may include any of, any combination of, or all of the advantages provided by the cassette (e.g. the cassette in combination with the PIC).

The at least one pump component may be a rotor 932 and when the cassette 900 is mounted in the reader the rotor 932 may compress a flexible tube of the cassette 900 against a guide member 930 of the cassette 900 to form a peristaltic pump. This may provide the advantages discussed above, in particular, the more costly parts of the pump may be reusable.

There is also provided a system comprising a cassette 900 as described herein and a photonic integrated circuit (PIC) reading device as described herein. The system may have any of, any combination of, or all of, the advantages and/or features of the cassette 900 and PIC reading device as described herein.

When used in this specification and claims, the terms "comprises" and "comprising" and variations thereof mean that the specified features, steps or integers are included. The terms are not to be interpreted to exclude the presence of other features, steps or components.

The invention may also broadly consist in the parts, elements, steps, examples and/or features referred to or indicated in the specification individually or collectively in any and all combinations of two or more said parts, elements, steps, examples and/or features. In particular, one or more features in any of the embodiments described herein may be combined with one or more features from any other embodiment(s) described herein.

Protection may be sought for any features disclosed in any one or more published documents referenced herein in combination with the present disclosure.

Although certain example embodiments of the invention have been described, the scope of the appended claims is not intended to be limited solely to these embodiments. The claims are to be construed literally, purposively, and/or to encompass equivalents.

The invention claimed is:

1. A polymer based photonic integrated circuit (PIC) comprising:

a first polymeric layer, the first polymeric layer having a refractive index of from 1.3 to 1.8 at a wavelength of 1300 nm; and a second polymeric layer on the first polymeric layer, the second polymeric layer having a refractive index of from 1.4 to 2.0 at a wavelength of 1300 nm and an optical loss of at most 10 dB/cm at a wavelength of 1300 nm, wherein the difference between the refractive index of the first polymeric layer and the refractive index of the second polymeric layer is at least 0.1 at a wavelength of 1300 nm;

wherein an interface between the first polymeric layer and the second polymeric layer is patterned with a relief pattern to form a plurality of optical elements; and wherein the plurality of optical elements comprises an I/O grating, a 2D waveguide, and a spectral shaping element; and wherein the spectral shaping element is coated with capture agents capable of capturing a specific molecule of interest.

2. The PIC of claim 1, wherein the plurality of optical elements further comprise one or more optical elements selected from the group consisting of: tapered waveguides, waveguides, waveguide based optical splitters, and waveguide based optical couplers.

3. The PIC of claim 1, wherein the polymers used for generating the PIC are selected from the group consisting of: UV curable resins, polyimides, and sol-gels.

4. The PIC of claim 1, wherein the first polymeric layer or the second polymeric layer:

is or comprises a hybrid organic-inorganic polymer; or is formed from a hybrid organic-inorganic polymer sol-gel.

5. The PIC of claim 1, wherein the relief pattern has a depth of from 100 nm to 2000 nm.

6. The PIC of claim 1, wherein features of the relief pattern have widths perpendicular to the direction of light wave travel of from 800 nm to 30,000 nm.

7. The PIC of claim 1, wherein the spectral shaping elements are selected from the group consisting of: interferometers, resonators, Mach-Zehnder Interferometers (MZI), and ring resonators.

8. The PIC of claim 1, wherein the spectral shaping element includes a curved waveguide having a radius of less than 300 μm.

9. The PIC of claim 1, further comprising an additional spectral shaping element, wherein the additional spectral shaping element is coated with additional capture agents capable of capturing an additional specific molecule of interest, and wherein the capture agents and the additional capture agents are different capture agents and the specific molecule of interest and the additional specific molecule of interest are different molecules.

10. The PIC of claim 1, further comprising a layer of a dielectric material on the first polymeric layer, optionally wherein the thickness of the dielectric layer is from 5 nm to 40 nm thick.

11. A method of optical bio-sensing comprising:

providing the polymer based photonic integrated circuit (PIC) of claim 1 coupling light to and from the optical device to read the spectral signature of the optical device;

exposing the capture agents to a sample;

reading the spectral signature of the optical device; and determining whether the specific molecule of interest is present in the sample by monitoring for a change in the spectral signature of the optical device due to a binding event between the specific molecule of interest and the capture agent.

12. The method of claim 11, wherein the capture agents are selected from the group consisting of: antibodies or their fragments, aptamers/peptide nucleic acids and their chemical derivatives, somamers, enzymes, peptides, molecularly imprinted polymers, cells, and DNA.

13. The method of claim 11, further comprising measuring the rate of change of the spectral signature to determine the concentration of the molecule of interest in the fluid sample.

14. The method of claim 11, wherein the PIC further comprises an additional optical device comprising I/O optical ports and an additional spectral shaping element, wherein the additional spectral shaping element is coated with additional capture agents capable of capturing an additional specific molecule of interest, and wherein the capture agents and the additional capture agents are different capture agents and the specific molecule of interest and the additional specific molecule of interest are different molecules; and wherein the method further comprises monitoring of the additional optical device's spectral signature, indicating the concentration of the additional molecule of interest within the fluid.

15. A polymer based photonic integrated circuit (PIC) comprising:

a first polymeric layer, the first polymeric layer having a refractive index of from 1.4 to 2.0 at a wavelength of 1300 nm; and wherein an interface of the first polymeric layer is patterned with a relief pattern to form a plurality of optical elements; and wherein the plurality of optical elements comprises an I/O grating, a 2D waveguide, and a spectral shaping element, and wherein the spectral shaping element is coated with capture agents capable of capturing a specific molecule of interest.

16. A polymer based photonic integrated circuit (PIC) comprising:

a first polymeric layer on the substrate; and a second polymeric layer on the first polymeric layer, wherein an interface between the first polymeric layer and the second polymeric layer is patterned with a relief pattern to form a plurality of optical elements, wherein the plurality of optical elements comprise connected optical elements forming an optical device, and wherein the optical device comprises an I/O grating, a 2D waveguide, and a spectral shaping element; and wherein the spectral shaping element is coated with capture agents capable of capturing a specific molecule of interest.

17. The PIC of claim 16, wherein the plurality of optical elements further comprise one or more optical elements selected from the group consisting of: tapered waveguides, waveguides, waveguide based optical splitters, and waveguide based optical couplers.

18. The PIC of claim 16, wherein the spectral shaping elements are selected from the group consisting of: interferometers, resonators, Mach-Zehnder Interferometers (MZI), and ring resonators.

19. The PIC of claim 16, wherein the spectral shaping element includes a curved waveguide having a radius of less than 300 μm.

* * * * *